US009276769B2

(12) United States Patent
Hsiao et al.

(10) Patent No.: US 9,276,769 B2
(45) Date of Patent: Mar. 1, 2016

(54) CIRCUIT BUNDLE FOR RESILIENCY/PROTECTION OF CIRCUITS

(75) Inventors: Man-Tung T. Hsiao, Cupertino, CA (US); Lisa H. Nguyen, San Jose, CA (US); Yung-Ching Tseng, Sunnyvale, CA (US); Rajiv Goel, Sunnyvale, CA (US)

(73) Assignee: Coriant Operations, Inc., Naperville, IL (US)

( * ) Notice: Subject to any disclaimer, the term of this patent is extended or adjusted under 35 U.S.C. 154(b) by 1043 days.

(21) Appl. No.: 11/858,031

(22) Filed: Sep. 19, 2007
(Under 37 CFR 1.47)

(65) Prior Publication Data

US 2009/0109869 A1 Apr. 30, 2009

(51) Int. Cl.
*H04L 12/28* (2006.01)
*H04L 12/46* (2006.01)
*H04L 12/24* (2006.01)
*H04L 12/701* (2013.01)
*H04L 12/707* (2013.01)
*H04L 12/703* (2013.01)
*H04L 12/723* (2013.01)

(52) U.S. Cl.
CPC ........ *H04L 12/4641* (2013.01); *H04L 41/0806* (2013.01); *H04L 45/00* (2013.01); *H04L 45/22* (2013.01); *H04L 45/28* (2013.01); *H04L 45/50* (2013.01); *H04L 41/0869* (2013.01)

(58) Field of Classification Search
None
See application file for complete search history.

(56) References Cited

U.S. PATENT DOCUMENTS

| | | | | |
|---|---|---|---|---|
| 6,778,492 | B2 * | 8/2004 | Charny et al. | 370/228 |
| 7,590,115 | B1 * | 9/2009 | Aggarwal et al. | 370/390 |
| 2003/0048778 | A1 * | 3/2003 | Davison | 370/389 |
| 2004/0133619 | A1 * | 7/2004 | Zelig et al. | 709/200 |
| 2005/0276217 | A1 * | 12/2005 | Gadgil et al. | 370/225 |
| 2006/0018252 | A1 * | 1/2006 | Sridhar et al. | 370/216 |
| 2006/0182033 | A1 | 8/2006 | Chen et al. | 370/237 |
| 2006/0187856 | A1 * | 8/2006 | Booth et al. | 370/254 |
| 2007/0008982 | A1 * | 1/2007 | Voit et al. | 370/401 |
| 2007/0019646 | A1 * | 1/2007 | Bryant et al. | 370/390 |

(Continued)

FOREIGN PATENT DOCUMENTS

| | | |
|---|---|---|
| WO | 2006/030435 | 3/2006 |
| WO | 2007/039827 | 4/2007 |

OTHER PUBLICATIONS

Cisco Systems. "Cisco IOS MPLS Virtual Private LAN Service (VPLS) Technical Development Overview". 2004. pp. 1-45. <www.cisco.com>.*

(Continued)

*Primary Examiner* — Jae Y Lee
*Assistant Examiner* — Thinh Tran
(74) *Attorney, Agent, or Firm* — Fitzpatrick, Cella, Harper & Scinto

(57) ABSTRACT

A device having circuit bundles and a method of configuring the network device to provide resiliency and protection for network circuits. A circuit bundle provides the ability to group multiple circuits of the same type for resiliency/protection. There is an active virtual circuit that is selected based on a user configured priority value defining priority for carrying circuit traffic. When the active virtual circuit fails, alternative virtual circuits are selected to carry the circuit traffic, again based on user configured priority. Virtual circuits included in the circuit bundle can have different destinations, and include at least multipoint virtual circuits.

23 Claims, 13 Drawing Sheets

(56) References Cited

U.S. PATENT DOCUMENTS

| | | | | |
|---|---|---|---|---|
| 2007/0268915 | A1* | 11/2007 | Zelig et al. | 370/401 |
| 2007/0286204 | A1* | 12/2007 | Ould-Brahim | 370/395.5 |
| 2008/0151880 | A1* | 6/2008 | Willhite et al. | 370/359 |
| 2008/0253367 | A1* | 10/2008 | Ould-Brahim | 370/389 |
| 2009/0003200 | A1* | 1/2009 | So | 370/229 |

OTHER PUBLICATIONS

Lasserre, Marc, "Virtual Private LAN Services over MPLS", draft-ietf-l2vpn-vpls-ldp-06.txt (Feb. 2005).
Martini, Luca, "Requirements for inter domain Pseudo-wires", draft-martini-pwe3-mh-pw-requirements-01.txt (Feb. 2005).
Martini, Luca, "Pseudo Wire Switching", draft-martini-pwe3-pw-switching-03.txt (Apr. 2005).
Muley, Praveen, "PW Redundancy", draf-muley-pwe3-redundancy-00.txt (Jul. 5, 2006).
Pan, P., "Pseudo Wire Protection", draft-pan-pwe3-protection-03.txt (Jul. 2006).
"L2VPN Pseudowire Redundancy", Cisco Systems (Apr. 20, 2005).
Farkas J., et al: "Fast Failure Handling in Ethernet Networks" Communications, ICC. IEEE International Conference on, Jun. 13, 2006, pp. 841-846, ISSN: 8164-9547.
"Protection switching for MPLS networks; Y. 1720 (04/03)" ITU-T Standard Superseded (S), International Telecommunication Union, Geneva, CH, No. Y. 1720, Apr. 6, 2003.
PCT International Search Report in corresponding International Application No. PCT/US2007/079080, dated Jan. 8, 2008.
Written Opinion of the International Searching Authority in corresponding International Application No. PCT/US2007/079080, dated Jan. 8, 2008.

* cited by examiner

CIRCUIT BUNDLE FOR RESILIENCY/PROTECTION OF CIRCUITS

BACKGROUND

1. Field

Example aspects of the present invention generally relate to network configuration, and, more particularly, to configuring a network to provide resiliency and protection for network circuits.

2. Related Art

Virtual Private Wire Service (VPWS) and Virtual Private LAN Service (VPLS) applications provide connectivity between customer sites (end nodes) using virtual circuits that emulate a private path through a service provider's MultiProtocol Label Switching (MPLS) backbone network. VPWS applications provide point-to-point connectivity between customer sites, whereas VPLS applications provide multipoint connectivity, emulating the function of a LAN switch or bridge to connect all of the customer LANs to create a single bridged (Ethernet) LAN. Virtual circuits can emulate existing layer-2 links, such as, for example, Asynchronous Transfer Mode (ATM) and Frame Relay links.

One difference between a VPLS application and a VPWS application is that the VPWS application provides a point-to-point service, whereas the VPLS application provides a point-to-multipoint service. Accordingly, the requirements on customer edge (CE) devices are different for VPLS and VPWS applications. In a VPWS application, CE routers provide layer-2 switching and choose which virtual circuit to use to send data to another customer site. By comparison, in a VPLS application, CE routers send all traffic destined for other sites to the provider edge (PE) router, which routes the traffic to the relevant destination PE routers.

BRIEF DESCRIPTION

Because virtual circuits for point-to-point services may operate differently than virtual circuits for multipoint services, a point-to-point virtual circuit protection mechanism may not also provide protection for multipoint virtual circuits.

The example embodiments described herein overcome the above-identified limitation by providing a device and network having circuit bundles and a method and computer program for configuring a network device to provide resiliency and protection for network circuits of different types.

A circuit bundle provides the ability to group multiple circuits of the same type for resiliency/protection. The circuit bundle includes an active virtual circuit that is selected based on user configured priority for carrying circuit traffic. When the active virtual circuit fails for some reason, alternative virtual circuits are selected to carry the circuit traffic, again based on user-configured priority. Virtual circuits included in the circuit bundle can have different destinations, and include at least multipoint virtual circuits.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings in which like reference numbers indicate identical or functionally similar elements.

DETAILED DESCRIPTION

Figure 1:
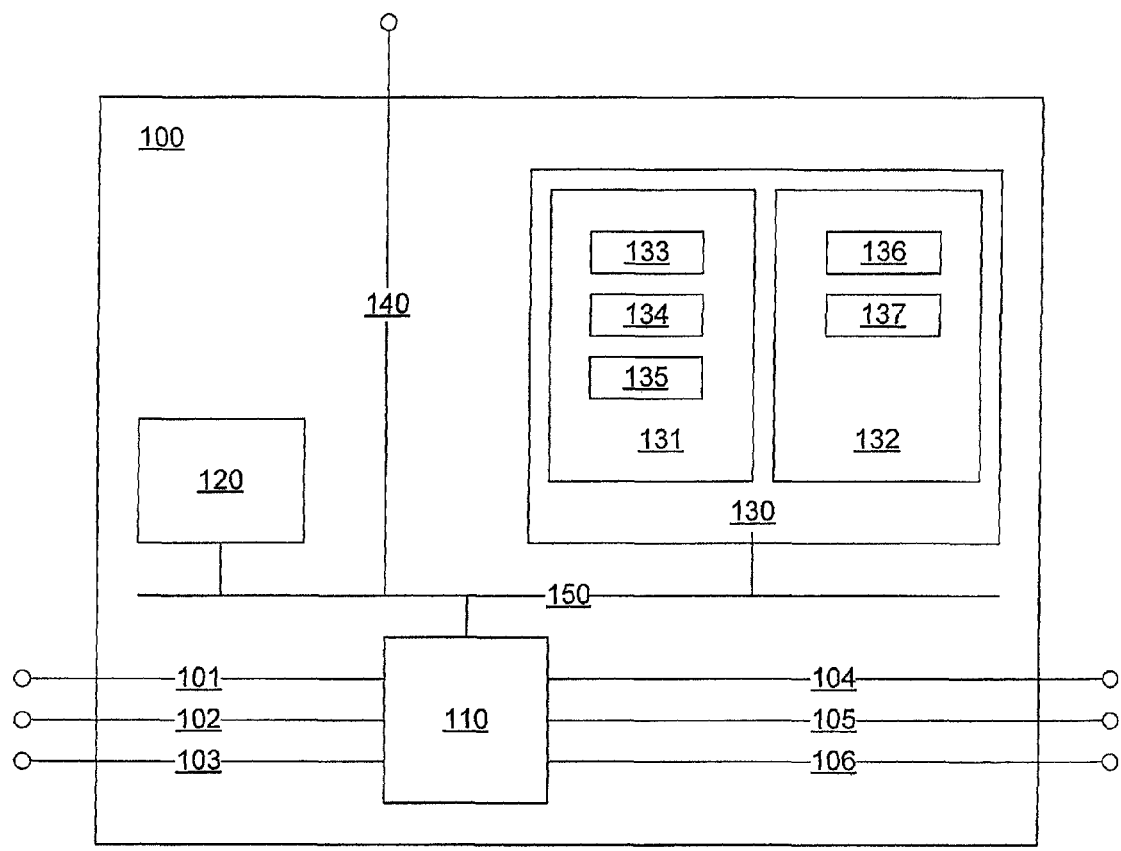
FIG. 1 is an architecture diagram of a network device in accordance with an example embodiment of the invention.

FIG. 1 is an architecture diagram of a network device in accordance with an example embodiment of the invention. Network device 100 is an intermediary network device, such as a router, switch, routing switch, or any other suitable type of device capable of operating within a network. Network device 100 is configured to forward data packets received via one or more network devices, to at least one other network device. Network device 100 has two or more network interfaces 101 through 106, a packet switch 110, a processor 120, a memory 130, and a configuration interface 140. Processor 120, memory 130, and configuration interface 140 are all interconnected via bus 150. Network interfaces 101 through 106 are all interconnected via packet switch 110.

Network interfaces 101 through 106 may be layer-2 network interfaces, such as Ethernet, Interworking Function (IWF), Virtual Local Area Network (VLAN), Asynchronous Transfer Mode (ATM), Frame Relay network interfaces, or the like, layer-3 network interfaces, such as Internet Protocol (IP) interfaces, or the like, virtual circuit interfaces, such as Internet Protocol/MultiProtocol Label Switching (IP/MPLS), or the like, or any other suitable type of network interfaces.

An interface identifier is associated with each of network interfaces 101 through 106. The format of an interface identifier is defined by the protocol used by an interface. For example, an interface identifier for an interface using the Ethernet layer-2 network protocol can be a Gigabit Ethernet address, an interface identifier for an interface using the IP layer-3 network protocol can be an IP address, and an interface identifier for an interface using the IP/MPLS protocol can be a virtual circuit identifier. The interface identifier may be a hardcoded identifier (e.g., a MAC address) or a configured identifier (e.g., an IP address or virtual circuit identifier). Hardcoded interface identifiers are stored in a non-configurable memory (e.g., a Read Only Memory (ROM)) (not shown) of the interface hardware associated with an interface. Configured interface identifiers are stored as configuration data 131 in memory 130. Configuration data 131 includes interface identifier tables 133 through 135 associating interfaces with configured identifiers, as will be described below. These interface identifier tables are configured using configuration manager 136.

Configuration data 131 includes forwarding configuration information, such as forwarding table 133, circuit bundle table 134, and circuit table 135. Forwarding table 133 has table entries for interfaces 101 through 106 that specify where to forward received packets. Circuit bundle table 134 has table entries that define each circuit bundle. Circuit table 135 has table entries that define each virtual circuit. Forwarding tables, circuit bundle tables, and circuit tables will be described in more detail in the description of FIG. 2.

Memory 130 also stores program instructions 132. Program instructions 132 include program instructions that are used to control operation of configuration manager 136 and a packet forwarding manager 137. Configuration manager 136 processes configuration instructions sent or received via configuration interface 140, and interface failure communications sent or received by packet switch 110. Configuration instructions include instructions for configuring forwarding table 133, circuit bundle table 134, and circuit table 135. Configuration manager 136 can receive, via interface 140, configuration instructions sent by way of another network device, such as, for example, a user terminal or a network management device in communication with interface 140, using a network configuration protocol, such as Simple Network Management Protocol (SNMP), or any other suitable type of communication protocol. A network management device can send and receive configuration instructions using network management software running on the device. A user terminal can receive communication instructions from a user and present configuration information to a user using a user interface. A user interface includes a command line interface and a graphical user interface. Instructions 132 also include program instructions for performing example methods of this invention, such as those depicted in FIGS. 3-7.

Packet forwarding manager 137 processes received packets before they are forwarded from the device 100. Such processing can include adding or removing packet headers, verifying packets, or any other suitable type of packet processing. For example, packet forwarding manager 137 can encapsulate a packet received at one interface 101 through 106, encoded according to a protocol used by the interface, within a packet encoded according to a protocol used by another interface 101 through 106 through which the packet is forwarded, before forwarding the received packet to another network device (not shown).

Processor 120 executes program instructions 132. Packet switch 110 can be either a hardware or a software packet switch. Packet switch 110 forwards packets received via an interface 101 through 106, through another interface 101 through 106, in accordance with configuration data 131 and program instructions 132. Packet switch 110 also communicates interface failures to configuration manager 136.

Figure 2:
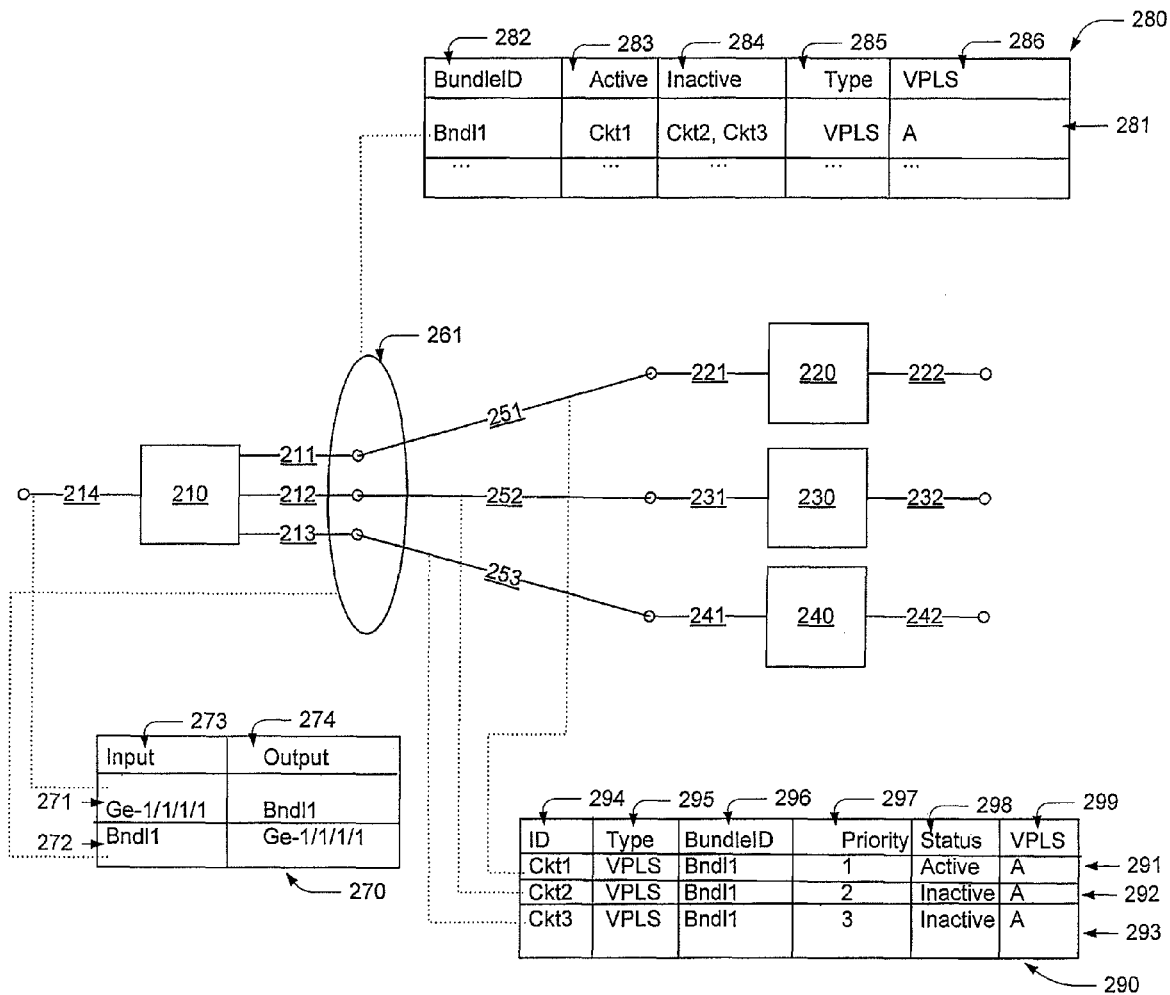
FIG. 2 is a network diagram showing interconnected network devices in accordance with an example embodiment of the present invention.

FIG. 2 is a network diagram showing interconnected network devices in accordance with an example embodiment of the present invention. Network device 210 is like the network device of FIG. 1, and thus will not be described in detail. Network devices 220, 230, and 240 can be devices similar to network device 210, or multi-tenant units (MTU), provider edge (PE) devices (e.g., routers, switches, and/or bridges), network transit routers, and the like, or any other suitable type of device capable of operating within a network, such as, for example, a Multi-Protocol Label Switching (MPLS) network.

Network device 210 has forwarding table 270, circuit bundle table 280, and circuit table 290 for storing configuration information for network device 210. Forwarding table 270, circuit bundle table 280, and circuit table 290 are similar to forwarding table 133, circuit bundle table 134, and circuit table 135, respectively, of FIG. 1, and can be configured by a user or by network management software, via a configuration interface (e.g., configuration interface 140 shown in FIG. 1).

Circuit bundle table 280 specifies configuration information for circuit bundles. A circuit bundle, such as circuit bundle 261, is a logical grouping of virtual circuits, each virtual circuit represented by a virtual circuit identifier. Circuit bundles have at most one active virtual circuit and any number of inactive virtual circuits. An inactive virtual circuit may be in a hot-standby state, such that the virtual circuit is established before any network failure occurs.

Figure 5:
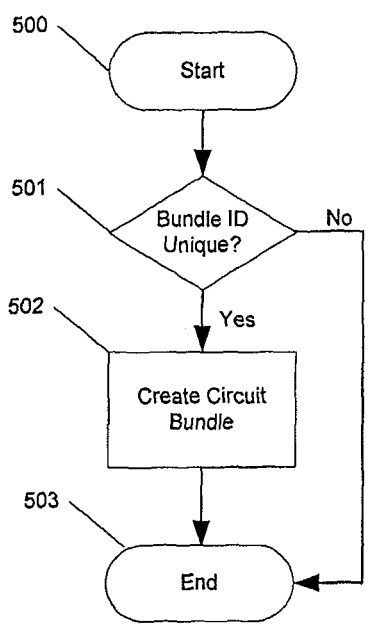
FIG. 5 is a flowchart depicting a process performed by a network device for creating a circuit bundle in accordance with an example embodiment of the invention.

Each row in circuit bundle table 280, such as row 281, has a bundle identifier column 282 specifying a circuit bundle identifier, an active virtual circuit column 283 specifying an active virtual circuit identifier, if any, an inactive virtual circuit column 284 specifying one or more inactive virtual circuit identifiers, if any, a type column 285 specifying the type of virtual circuits that may be included in the circuit bundle, and a Virtual Private LAN Service (VPLS) instance column 286 specifying the VPLS instance for a circuit bundle of type VPLS, as described below for FIG. 5. In other embodiments rows may have additional columns of information, and/or there may be additional rows.

Forwarding table 270 specifies forwarding destinations for received packets. Each row in forwarding table 270, such as rows 271 and 272, has an input interface identifier, specified in input interface identifier column 273, and a corresponding output interface identifier, specified in output interface identifier column 274, although in other embodiments those rows may specify additional information, and/or there may be additional rows. Packets received via an interface specified in an input interface identifier column are forwarded through the corresponding output interface, as will be described in more detail below.

Input interface identifier column 273 and output identifier column 274 can specify a circuit bundle, which may be associated with more than one interface. Packets are received via, and forwarded through, interface 211 associated with active virtual circuit 251 in circuit bundle 261, but in other embodiments packets may be received via interfaces 212 and 213 associated with inactive virtual circuits 252 and 253, respectively, as well. The interface associated with active virtual circuit 251 in circuit bundle 261 can be determined by retrieving row 281 in circuit bundle table 280, and retrieving the virtual circuit identifier from the active virtual circuit column 283.

Circuit table 290 specifies configuration information for virtual circuits. Virtual circuits, such as virtual circuits 251, 252, and 253, represent a logical path through a network connecting two network devices. Virtual circuits can be point-to-point virtual circuits (e.g., Martini circuits (pseudowires)), point-to-multipoint virtual circuits (e.g., Martini circuits (pseusowires)), or multipoint-to-multipoint virtual circuits (e.g., Virtual Private LAN Service (VPLS) circuits). Virtual circuits can use Forwarding Equivalence Class (FEC) 128, or any other suitable FEC. Each virtual circuit carries a single type of packet. Multipoint-to-multipoint virtual circuits can carry, for example, VPLS packets, or any other suitable type of packets encoded according to a multipoint-to-multipoint protocol. Point-to-point and point-to-multipoint virtual circuits can carry one of either Ethernet packets, Interworking Function (IWF) packets, Virtual Local Area Network (VLAN) packets, stacked VLAN packets (Q-in-Q), Asynchronous Transfer Mode (ATM) packets, Frame Relay packets, or any other suitable type of packets encoded according to a point-to-point protocol.

Each row in circuit table 290, such as rows 291, 292, and 293, has, for example, a virtual circuit identifier column 294, a virtual circuit type column 295, a circuit bundle identifier column 296, a circuit bundle priority column 297, a status column 298, and a VPLS instance column 299 specifying the VPLS instance for a circuit of type VPLS, although in other embodiments there may be additional rows and/or columns.

Virtual circuit identifier column 294 specifies a virtual circuit identifier. Virtual circuit type column 295 specifies a virtual circuit type, such as, for example, VPLS, Ethernet, Interworking Function (IWF), VLAN, VLAN (Q-in-Q), ATM, Frame Relay, or any other suitable virtual circuit type. Circuit bundle identifier column 296 specifies a circuit bundle identifier corresponding to a circuit bundle defined in circuit bundle table 280. Circuit bundle priority column 297 specifies priority information used to determine whether a virtual circuit is to be activated upon the occurrence of an event, such as, for example, the failure of a virtual circuit or the execution of a configuration instruction. Status column 298 (status) identifies a virtual circuit as either an active bundle member or an inactive bundle member.

Each interface 211 through 214 is like the interfaces of FIG. 1, and thus will not be described in detail. Interface 214 is associated with a Gigabit Ethernet interface identifier having the value "ge-1/1/1/1", for example, but in other embodiments interface 214 may be associated with an IP address interface identifier, a virtual circuit identifier, or any other predetermined type of interface identifier, having any predetermined value. Interfaces 211, 212, and 213 are associated with configured virtual circuit identifiers having the values, "ckt1", "ckt2", and "ckt3", respectively, for example, but in other embodiments, they may have any other predetermined value. Virtual circuit identifiers "ckt1", "ckt2", and "ckt3" correspond to end points of virtual circuits 251, 252, and 253, respectively, terminating at network device 210.

Virtual circuits 251, 252, and 253 are bundle members of circuit bundle 261. Virtual circuits 251, 252, and 253 and circuit bundle 261 are all type VPLS circuits, for example, but in other embodiments, they can be type Ethernet, Interworking Function (IWF), VLAN, VLAN (Q-in-Q), ATM, Frame Relay, or any other suitable types of virtual circuits. Circuit bundle 261 has the circuit bundle identifier value "bndl1", for example. Virtual circuit 251 is the active bundle member since it is associated with virtual circuit identifier "ckt1", which is listed in the active status column of circuit bundle table 280 (and which has an "active" status in circuit table 290). Virtual circuits 252 and 253 are inactive bundle members since they are associated with virtual circuit identifiers "ckt2" and "ckt3", which are listed in the inactive column of circuit bundle table 280 (and which have an "inactive" status in circuit table 290). As configured in circuit table 290, virtual circuits 251, 252, and 253 have priorities 1, 2, and 3 respectively, for example. These priority values determine which bundle member is to be activated when an active bundle member fails.

Virtual circuits 251, 252, and 253 are routes that can be formed by network cables, wireless interfaces, and intermediary network devices and the like. Virtual circuit 251 communicatively couples interface 211 of network device 210 with interface 221 of network device 220, virtual circuit 252 communicatively couples interface 212 of network device 210 with interface 231 of network device 230, and virtual circuit 253 communicatively couples interface 213 of network device 210 with interface 241 of network device 240.

Interfaces 214, 222, 232, and 242 can communicatively couple network devices 210, 220, 230, and 240, respectively, with any type of network device, such as a device similar to network devices 210, 220, 230, and 240, a computer terminal, a router, a switch, a modem, or any other suitable type of network device.

In operation, if network device 210 receives a packet via interface 214, it retrieves row 271 from forwarding table 270, which has the interface identifier corresponding to interface 214 in input interface identifier column 273, namely "ge-1/1/1/1". Network device 210 retrieves the output interface identifier specified in output interface identifier column 274 of row 271. Since output interface identifier column 274 of row 271 specifies a circuit bundle identifier, namely "bndl1", network device 210 searches circuit bundle table 280 for the active interface identifier associated with "bndl1". Network device 210 retrieves row 281 specifying "bndl1" in bundle identifier column 282 and retrieves the active virtual circuit identifier specified in active virtual circuit column 283, namely "ckt1". Network device 210 then forwards the received packet through the interface associated with "ckt1", namely interface 211, and the packet passes through virtual circuit 251, interface 221, and arrives at network device 220.

If network device 210 receives a packet via interface 212, it recognizes that interface 212 is associated with a virtual circuit, based on the format of the interface identifier associated with interface 212. In response to recognizing that interface 212 is associated with a virtual circuit, network device 210 then searches circuit table 290 to determine if interface 212 is associated with a circuit bundle. Network device 210 retrieves row 292 from circuit table 290, which has the interface identifier corresponding to interface 212, namely "ckt2". Network device 210 then retrieves the circuit bundle identifier, if any, specified in circuit bundle identifier column 296 of row 292. Since in the present example a circuit bundle identifier is specified in circuit bundle identifier column 296, namely "bndl1", network device 210 retrieves the status value specified in status column 298 of row 292 to determine whether interface 212 is an active bundle member. Since in the present example the status value specified in status column 298 indicates that interface 212 is an inactive bundle member, network device 210 does not forward the received packet.

If network device 210 receives a packet via interface 213, it recognizes that interface 213 is associated with a virtual circuit because the interface identifier associated with interface 213 ("ckt3") is a virtual circuit interface identifier. In response to recognizing that interface 213 is associated with a virtual circuit, network device 210 then searches circuit table 290 to determine if interface 213 is associated with a circuit bundle. Network device 210 retrieves row 293 from circuit table 290, which has the interface identifier corresponding to interface 213, namely "ckt3". Network device 210 then retrieves the circuit bundle identifier, if any, specified in circuit bundle identifier column 296 of row 293. Since in the present example a circuit bundle identifier is specified in circuit bundle identifier column 296, namely "bndl1", network device 210 retrieves the status value specified in status column 298 of row 293 to determine whether interface 213 is an active bundle member. Since in the present example the status value specified in status column 298 indicates that interface 213 is an inactive bundle member, network device 210 does not forward the received packet.

If network device 210 receives a packet via interface 211, it recognizes that interface 211 is associated with a virtual circuit because the interface identifier associated with interface 211 ("ckt1") is a virtual circuit interface identifier. In response to recognizing that interface 211 is associated with a virtual circuit, network device 210 then searches circuit table 290 to determine if interface 211 is associated with a circuit bundle. Network device 210 retrieves row 291 from circuit table 290, which has the interface identifier corresponding to interface 211, namely "ckt1". Network device 210 then retrieves the circuit bundle identifier, if any, specified in circuit bundle identifier column 296 of row 291. Since in the present example a circuit bundle identifier is specified in circuit bundle identifier column 296, namely "bndl1", network device 210 retrieves the status value specified in status column 298 of row 291 to determine whether interface 211 is an active bundle member. Since in the present example the status value specified in status column 298 indicates that interface 211 is an active bundle member, network device 210 searches forwarding table 270 for an output interface identifier, based on the circuit bundle identifier associated with interface 211. Network 210 retrieves row 272 specifying "ge-1/1/1/1" (e.g., interface 214) as the output interface identifier. The network device 210 then forwards the received packet through the interface associated with "ge-1/1/1/1", namely interface 214.

If an active virtual circuit fails, the network device activates an inactive virtual circuit, as described below in conjunction with FIG. 4.

Figure 3:
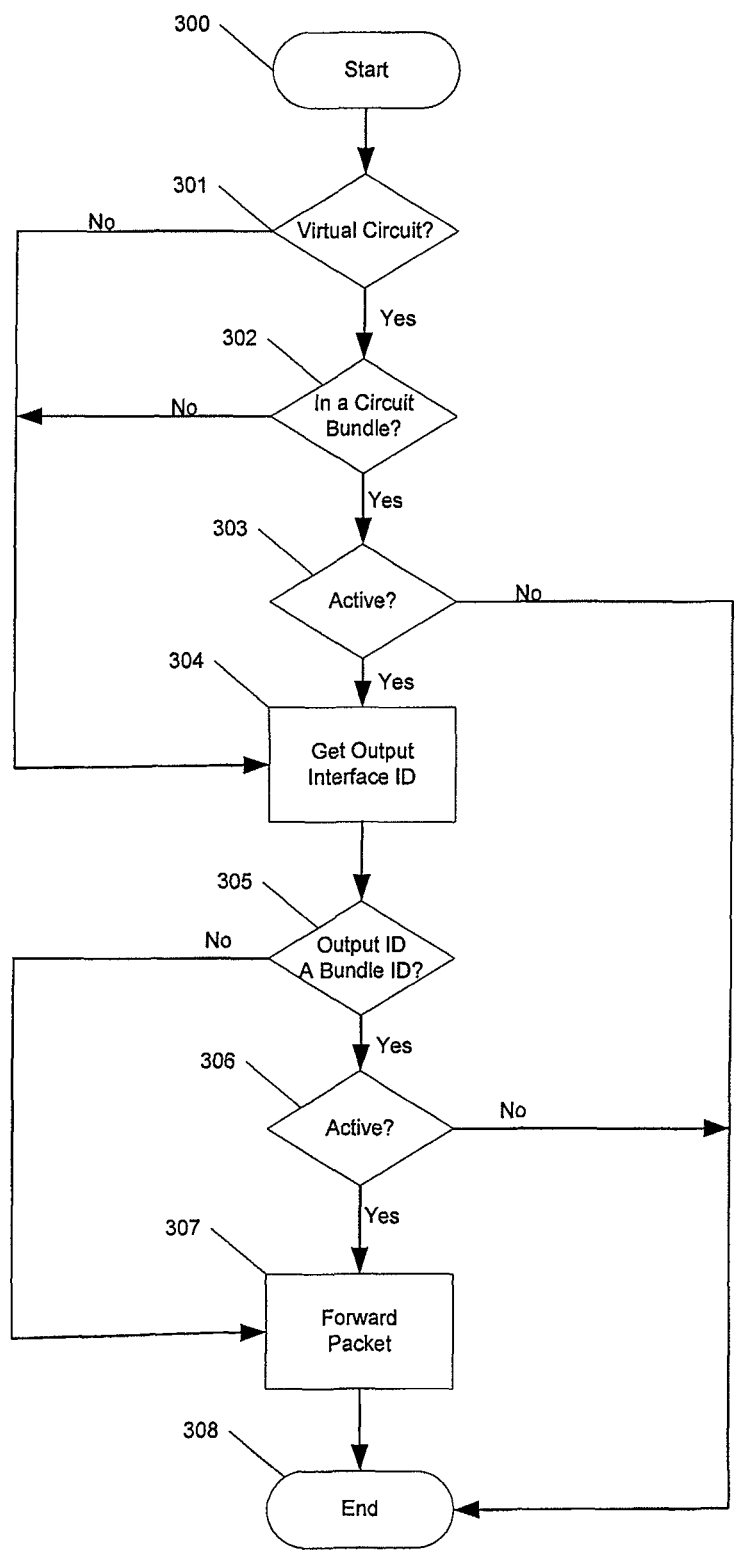
FIG. 3 is a flowchart depicting a process performed by a network device for forwarding a packet in accordance with an example embodiment of the invention.

FIG. 3 will now be described. FIG. 3 is a flowchart depicting a process performed by a network device (such as, e.g., network device 210 of FIG. 2) for forwarding a packet in accordance with an example embodiment of the invention. Network device 210 can be deployed in, for example, a Virtual Private Wire Service (VPWS) or Virtual Private LAN Service (VPLS) application, or any other suitable type of application. At block 300, the method starts and proceeds to block 301, where the network device receives a packet. The device then determines whether the destination interface identifier specified in the packet's header is a virtual circuit identifier, based on the format of the destination interface identifier. This determination is made by a packet switch (such as, e.g., packet switch 110 of FIG. 1).

If the interface identifier specified in the packet's header is not a virtual circuit identifier ("NO" at block 301), control passes to block 304 where packet switch 110 retrieves the corresponding output interface identifier (such as, e.g., "ge-1/1/1/1", "bndl1", "ckt1", "ckt2", or "ckt3") from a forwarding table (such as, e.g., forwarding table 133 of FIG. 1 or forwarding table 270 of FIG. 2).

If the interface identifier specified in the packet's header is a virtual circuit identifier ("YES" at block 301), processing proceeds to block 302 where packet switch 110 determines whether the same virtual circuit identifier is associated with a circuit bundle (such as, e.g., circuit bundle 261 of FIG. 1).

Packet switch 110 makes this determination by retrieving the row from a circuit table (such as, e.g., circuit table 290 of FIG. 2) having the specified virtual circuit identifier in the virtual circuit identifier column (such as, e.g., virtual circuit identifier column 294 of FIG. 2). Packet switch 110 then determines whether the circuit bundle identifier column (such as, e.g., circuit bundle identifier column 296 of FIG. 2) of the retrieved row specifies a circuit bundle. If the circuit bundle identifier column specifies a circuit bundle, then the virtual circuit identifier specified in the packet's header is associated with a circuit bundle.

For example, row 291 of circuit table 290 has the virtual circuit identifier "ckt1" in virtual circuit identifier column 294. Since circuit bundle identifier column 296 of row 291 specifies the circuit bundle identifier "bndl1", virtual circuit identifier "ckt1" is associated with a circuit bundle, namely the circuit bundle corresponding to circuit bundle identifier "bndl1" (e.g., circuit bundle 261).

If the virtual circuit identifier is not included in a circuit bundle table ("NO" at block 302), processing proceeds to block 304 where packet switch 110 retrieves the output interface identifier corresponding to the virtual circuit identifier specified in the packet's header from a forwarding table (such as, e.g., forwarding table 133 of FIG. 1).

If the virtual circuit identifier is included in a circuit bundle table ("YES" at block 302), processing proceeds to block 303 where packet switch 110 determines whether the virtual circuit identifier specified in the packet's header is associated with an active virtual circuit, based on information stored in the circuit table.

Packet switch 110 makes this determination by retrieving the row from the circuit table (e.g., 290), having the specified virtual circuit identifier in the virtual circuit identifier column (e.g., 294). Packet switch 110 then determines whether the status column (such as, e.g., status column 298 of FIG. 2) of the retrieved row indicates that the virtual circuit identifier specified in the packet's header is associated with an active virtual circuit. For example, row 291 of circuit table 290 has the virtual circuit identifier "ckt1" in virtual circuit identifier column 294, and status column 298 indicates that the virtual circuit identifier "ckt1" is associated with an active virtual circuit.

If the virtual circuit corresponding to the virtual circuit identifier is not active ("NO" at block 303), the packet is dropped and processing proceeds to block 308 and ends.

If the virtual circuit corresponding to the virtual circuit identifier is active ("YES" at block 303), processing proceeds to block 304 where packet switch 110 retrieves the corresponding output interface identifier from a forwarding table. Packet switch 110 retrieves the row from the forwarding table having the circuit bundle identifier that corresponds to the virtual circuit identifier, as determined at block 302, in the input interface identifier column (such as, e.g., input interface identifier column 273 of FIG. 2). Packet switch 110 then retrieves the output interface identifier from the output interface identifier column (such as, e.g., output interface identifier column 274 of FIG. 2) of the retrieved row.

For example, in FIG. 2, the virtual circuit identifier "ckt1" corresponds to circuit bundle identifier "bndl1". To retrieve the output interface corresponding to "ckt1", packet switch 110 retrieves the row of forwarding table 270 having "bndl1" in input interface identifier column 273, namely row 272. The interface identifier specified in output interface identifier column 274 of row 272, namely "ge-1/1/1/1", is the output interface corresponding to "ckt1".

After the device retrieves the output interface identifier in block 304, processing proceeds to block 305 where packet switch 110 determines whether the output interface identifier is a circuit bundle identifier, based on the format of the output interface identifier. For example, if the output interface identifier has a circuit bundle interface identifier format (e.g., "bndl1"), then packet switch 110 determines that the output interface identifier is a circuit bundle interface identifier.

If the output interface identifier is not a circuit bundle identifier ("NO" at block 305), processing proceeds to block 307 where packet switch 110 forwards the received packet through the interface corresponding to the output interface identifier. For example, since the output interface identifier "ge-1/1/1/1" specified in row 272 of FIG. 2 is not a circuit bundle identifier, packet switch 110 forwards the received packet through the interface associated with "ge-1/1/1/1", namely interface 214.

If the output interface identifier is a circuit bundle identifier ("YES" at block 305), processing proceeds to block 306 where packet switch 110 determines whether the corresponding circuit bundle includes an active virtual circuit, based on the circuit bundle table. Packet switch 110 makes this determination by retrieving the row from the circuit bundle table (such as, e.g., circuit bundle table 280 of FIG. 2) having the circuit bundle identifier retrieved in block 304 in the circuit bundle identifier column (such as, e.g., bundle identifier column 282). Packet switch 110 then determines whether the active virtual circuit column (such as, e.g., active virtual circuit column 283 of FIG. 2) of the retrieved row specifies an active virtual circuit.

For example, row 281 of circuit bundle table 280 specifies "bndl1" in circuit bundle identifier column 282. Active virtual circuit column 284 of row 281 indicates that the circuit bundle associated with "bndl1", namely circuit bundle 261, includes an active virtual circuit associated with virtual circuit identifier "ckt1", namely virtual circuit 251.

If the circuit bundle does not include an active virtual circuit ("NO" at block 306), the packet is not forwarded and processing proceeds to block 308 and ends. If the circuit bundle does include an active virtual circuit ("YES" at block 306), packet switch 110 retrieves the interface identifier for the active virtual circuit, and processing proceeds to block 307 where the device forwards the received packet through the interface corresponding to the active virtual circuit's interface identifier.

For example, in circuit bundle table 280, active virtual circuit column 283 of row 281 indicates that "bndl1" includes an active virtual circuit associated with the virtual circuit identifier "ckt1". Therefore, packet switch 110 forwards the received packet through the interface associated with "ckt1", namely interface 211.

After the device forwards the received packet in block 307, processing proceeds to block 308 and ends.

Figure 4:
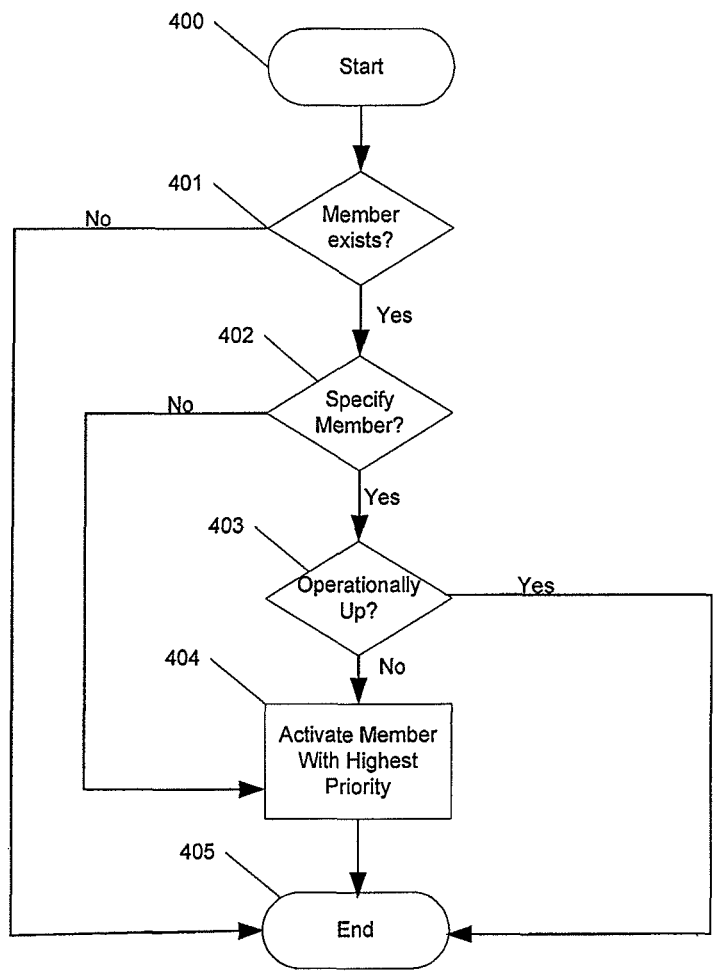
FIG. 4 is a flowchart depicting a process performed by a network device for performing a bundle member switch-over in accordance with an example embodiment of the invention.

FIG. 4 will now be described. FIG. 4 is a flowchart depicting a process performed by a network device (such as, e.g., network device 210 of FIG. 2) for performing a bundle member (virtual circuit) switch-over in accordance with the example embodiment of the invention. In block 400, the method starts and proceeds to block 401, where the network device processes a bundle switch-over instruction to activate an inactive bundle member as the new active bundle member. The bundle switch-over instruction is stored in a memory of the device (e.g., program instructions 132 of FIG. 1). The bundle switch-over instruction can be executed by a processor of the device (such as, e.g., processor 120 of FIG. 1) in response to receiving a configuration instruction via a configuration interface (such as, e.g., configuration interface 140 shown in FIG. 1), a notification sent by a packet switch (such as, e.g., packet switch 110 of FIG. 1) indicating that an active bundle member has failed, a notification sent by packet switch 110 that a failed bundle member has returned to a non-failed state, the availability of a bundle member having a higher priority than the active bundle member, or any other predetermined type of triggering event.

Packet switch 110 can detect a bundle member failure by detecting a loss of signal, by receiving a failure notification message via the failed bundle member, by detecting a failure of a Label Switched Path (LSP) used by the bundle member (in a MPLS network), by detecting a failure of a Label Distribution Protocol (LDP) session used by the bundle member (in a MPLS network), by receiving a Label Withdraw message for withdrawing an MPLS label used by the bundle member (in a MPLS network), or by any other suitable type of failure detection means. Packet switch 110 can detect when a bundle member returns to a non-failed state by detecting the presence of a signal, by receiving a non-failed state message via the bundle member, by detecting that the Label Switched Path (LSP) used by the bundle member returns to a non-failed state, by detecting that the Label Distribution Protocol (LDP) session used by the bundle member returns to a non-failed state, or by any other suitable type of detection means.

In block 401, network device 210 determines whether an inactive bundle member exists. This determination is made by a configuration manager (such as, e.g., configuration manager 136 of FIG. 1). Configuration manager 136 retrieves the row of the circuit bundle table (such as, e.g., circuit bundle table 280 of FIG. 2) corresponding to the circuit bundle to see if inactive bundle members are specified. For example, inactive virtual circuit column 284 indicates that circuit bundle 261 ("bndl1") has two inactive bundle members, namely virtual circuit 252 ("ckt2") and virtual circuit 253 ("ckt3").

If an inactive bundle member does not exist ("NO" at block 401), the bundle member-switch-over cannot be completed, and processing proceeds to block 405 and ends.

If one or more inactive bundle members do exist ("YES" at block 401), processing proceeds to block 402 where the device determines whether the switch-over instruction includes parameters that specify which bundle member to activate. For example, if a user sends a configuration instruction via a configuration interface (e.g., configuration interface 140) for executing a switch-over instruction for activating interface 212 ("ckt2"), the switch-over instruction includes parameters specifying "ckt2" as the bundle member to activate.

If the switch-over instruction does not specify which bundle member to activate ("NO" at block 402), processing proceeds to block 404 where the device activates the operationally up (i.e., capable of sending and receiving packets) bundle member that has the highest priority. Processing proceeds to block 405 and ends.

For example, in circuit table 290 of FIG. 2, "ckt2" and "ckt3" are both bundle members of "bndl1", since circuit bundle identifier column 296 of rows 292 and 293 both specify "bndl1". In this example, the interfaces (e.g., 212, and 213), the LDP sessions, and the LSPs used by "ckt2" and "ckt3", respectively, are in a non-failed state. Therefore, "ckt2" and "ckt3" are capable of sending and receiving packets, and thus, both operationally up.

However, circuit bundle priority column 297 of row 292 specifies a priority of "2" for "ckt2", and circuit bundle priority column 297 of row 293 specifies a priority of "3" for "ckt3". Because the priority value "2" indicates a greater priority than the priority value "3", the device activates the interface associated with "ckt2", namely interface 212.

If the switch-over instruction specifies which bundle member to activate ("YES" at block 402), processing proceeds to block 403 where network device 210 determines whether the specified bundle member is operationally up by checking for notifications indicating that the bundle member has failed, by sending a packet via the bundle member and checking for responsive errors, by checking the status of the LDP session used by the bundle member, by checking the status of the LSP used by the bundle member, or by any other suitable process for determining whether a bundle member is operationally up.

If the specified bundle member is operationally up ("YES" at block 403), the device activates the specified bundle member, and processing proceeds to block 405 and ends.

If the specified bundle member is not operationally up ("NO" at block 403), processing proceeds to block 404 where the device activates the operationally up bundle member having the highest priority, as described above, and processing proceeds to block 405 and ends.

In this manner, a new active bundle member of a circuit bundle is selected if the active bundle member becomes inactive in response to a predetermined condition, such as, a network failure or a configuration command. Thus, network devices communicating via a circuit bundle can continue communicating if the active bundle member becomes inactive.

FIG. 5 will now be described. FIG. 5 is a flowchart depicting a process performed by a network device (such as, e.g., network device 210 of FIG. 2) for creating a circuit bundle in accordance with the example embodiment of the invention.

In block 500, the method starts and proceeds to block 501, where the network device processes an instruction to create a circuit bundle (such as, e.g., circuit bundle 261 of FIG. 2). The instruction is stored in a memory of the device (e.g., program instructions 132 of FIG. 1). The circuit bundle creation instruction can be executed by a processor of the device (such as, e.g., processor 120 of FIG. 1) in response to receiving a configuration instruction from network management software or a user interface, via a configuration interface (e.g., configuration interface 140 shown in FIG. 1).

For example, a user can use a command line user interface to enter a command to create a circuit bundle. The command-line interface can be located, for example, on the device or on another device communicatively coupled with the device via a configuration interface (such as, e.g., configuration interface 140 of FIG. 1). The command specifies a circuit bundle identifier, a circuit bundle type, and other optional circuit bundle parameters. Optional circuit bundle parameters can be changed after the circuit bundle is created.

In accordance with an example aspect of the invention, an optional circuit bundle parameter can specify the name of a Virtual Private LAN Service (VPLS) instance that a circuit bundle of type VPLS belongs to. A VPLS instance is a set of program instructions (e.g., program instructions 132 of FIG. 1) executed by a processor (e.g., processor 120 of FIG. 1) on a network device (e.g., network device 210 of FIG. 2). A VPLS instance creates an Ethernet Media Access Control (MAC) address table and enables the device to act as an Ethernet switch or bridge and participate in a virtual LAN (e.g., a VPLS domain) composed of multiple VPLS instances, each instance running on a unique network device. This parameter can be set to specify which VPLS virtual circuits can be added to the circuit bundle. This parameter is compared with the VPLS instance of a virtual circuit being added to the circuit bundle to determine whether the virtual circuit is associated with the same VPLS instance as the circuit bundle, as described below for FIG. 6.

In accordance with an example aspect of the invention, another optional circuit bundle parameter can specify whether a MAC address withdraw message should be sent whenever the active virtual circuit in a circuit bundle fails, as described below for FIGS. 11 and 12. A MAC address withdraw message is a message instructing another network device to remove MAC addresses from its MAC address table (e.g., the MAC address table of a VPLS instance). Because MAC addresses received via a failed virtual circuit may no longer be valid, sending MAC address withdraw messages can remove invalid MAC addresses from MAC address tables of interconnected network devices. This option can be enabled by default for VPLS circuit bundles and disabled by default for other types.

Another optional circuit bundle parameter can specify whether individual messages (traps) for bundle operational status changes should be sent for the bundle, or whether a bulk trap should be sent. This option can be disabled by default.

In accordance with an example aspect of the invention, another optional circuit bundle parameter can specify the time in, for example, seconds, before switch-over in case a failed bundle member returns to a non-failed state, or in case a bundle member with a higher priority than the active bundle member becomes available. This option is set to trigger a bundle member switch-over instruction, as described above for FIG. 4, if a preferred bundle member becomes available.

Another optional circuit bundle parameter can specify when the active virtual circuit in a circuit bundle (bundle member) will start sending and receiving packets. This parameter can be set to "enable" even before any bundle member is added to the circuit bundle. If an enabled circuit bundle has no bundle members, the circuit bundle is not operational until the first operationally up member is added. If an enabled circuit bundle has bundle members, the device will activate a bundle member that is operationally up and has the highest priority, after the circuit bundle is enabled.

In block 501, the device determines whether the circuit bundle identifier specified in the configuration instruction is unique.

This determination is made by a configuration manager (such as, e.g., configuration manager 136 of FIG. 1). For example, configuration manager 136 searches for a row of the circuit bundle table (such as, e.g., circuit bundle table 280 of FIG. 2) having the specified circuit bundle identifier in the circuit bundle identifier column. If such a row does not exist, then the circuit bundle identifier is unique. For example, in FIG. 2, circuit bundle identifier column 282 of row 281 specifies the circuit bundle identifier "bndl1". Therefore, in this example, the circuit bundle identifier "bndl1" is not unique.

If the circuit bundle identifier specified in the configuration instruction is not unique ("NO" at block 501), the circuit bundle creation cannot be completed, and processing proceeds to block 503 and ends.

If the circuit bundle identifier specified in the configuration instruction is unique ("YES" at block 501), processing proceeds to block 502 where the device creates a new table entry in a circuit bundle table (e.g., circuit bundle table 134 in FIG. 1 or circuit bundle table 280 in FIG. 2), and stores the parameters specified in the configuration instruction in the new table entry. For example, when circuit bundle 261 ("bndl1") in FIG.

2 is created, row 281 is added to circuit bundle table 280. Processing then proceeds to block 503 and ends.

In this manner, a circuit bundle for grouping and managing backup virtual circuits that operate in accordance with the operating criteria of the network in which the device is operating can be created.

Figure 6:
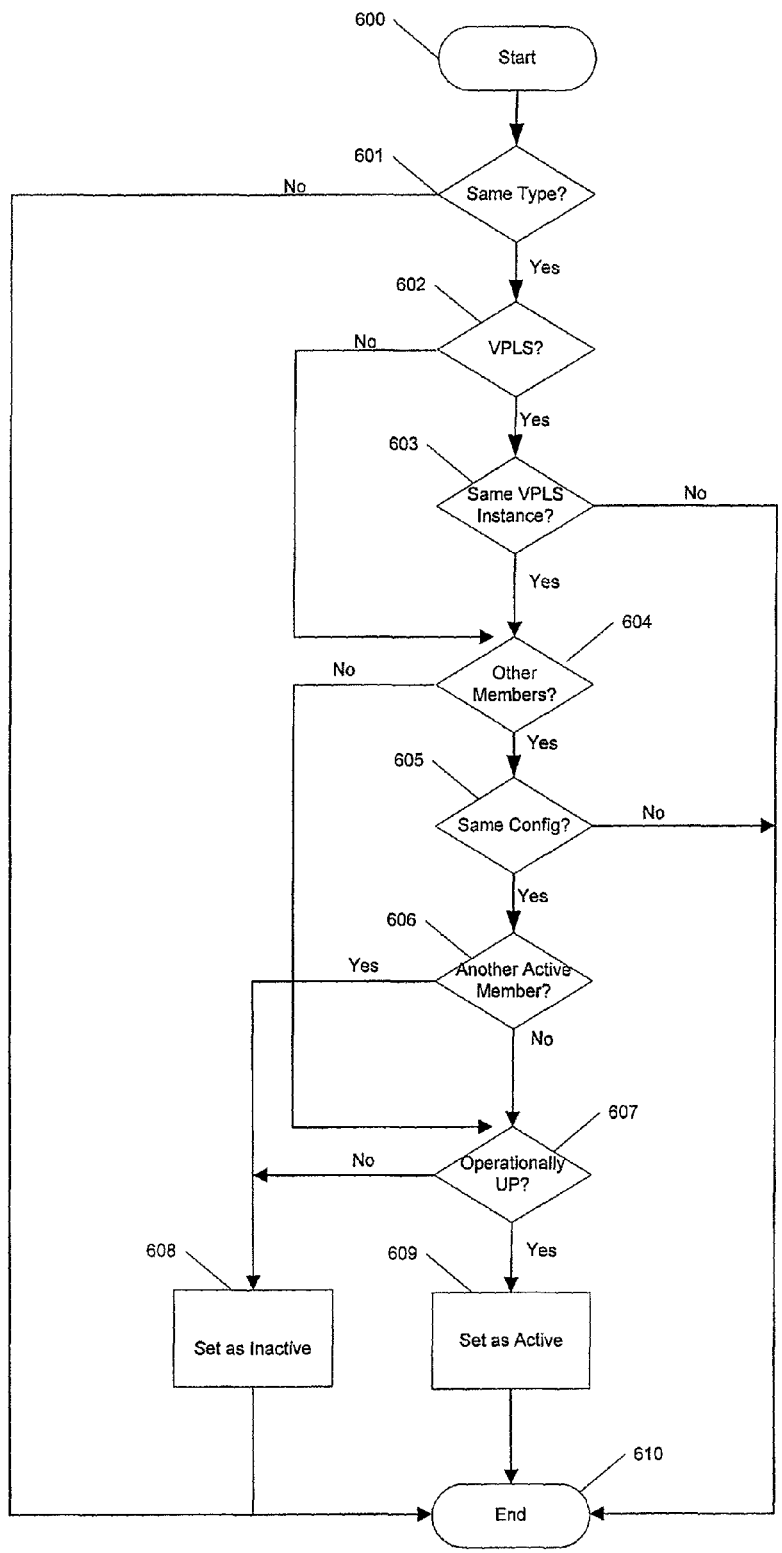
FIG. 6 is a flowchart depicting a process performed by a network device for adding a virtual circuit to a circuit bundle in accordance with an example embodiment of the invention.

FIG. 6 will now be described. FIG. 6 is a flowchart depicting a process performed by a network device (such as, e.g., network device 210 of FIG. 2) for adding a virtual circuit to a circuit bundle in accordance with the example embodiment of the invention.

In block 600, the method starts and proceeds to block 601, where the network device processes a configuration instruction to add a virtual circuit to a circuit bundle. The instruction is stored in a memory of the device (e.g., program instructions 132 of FIG. 1). The add virtual circuit instruction can be executed by a processor of the device (such as, e.g., processor 120 of FIG. 1) in response to receiving a configuration instruction from network management software or a user interface, via a configuration interface (e.g., configuration interface 140 shown in FIG. 1).

For example, a user can use a command line interface to enter a command to add a virtual circuit to a circuit bundle specifying a circuit identifier, a circuit type, a circuit bundle identifier, and other optional circuit parameters. Optional circuit parameters can be changed after the circuit is added.

An optional circuit parameter can specify a circuit bundle priority used to determine when the virtual circuit is to be activated upon the occurrence of an event, such as, for example, the failure of a virtual circuit or the execution of a configuration instruction. Another optional circuit parameter can specify the name of a VPLS instance that a circuit of type VPLS belongs to, as described above for FIG. 5.

If a circuit bundle priority parameter in the command does not specify a circuit bundle priority value, the device automatically specifies a priority, based on the next available priority value. For example, in circuit bundle table 280 of FIG. 2, "ckt1", "ckt2", and "ckt3" are all circuit bundle members of "bndl1", and have priority values "1", "2", and "3", respectively, as specified in priority column 297 of circuit table 290. Therefore, the next available priority value is "4", which is the priority value specified by the device if the command does not specify a circuit bundle priority value.

In block 601, the device determines whether the virtual circuit is the same type as the circuit bundle. This determination is made by a configuration manager (such as, e.g., configuration manager 136 of FIG. 1). Configuration manager 136 retrieves the row of the circuit bundle table (such as, e.g., circuit bundle table 280 of FIG. 2) having the circuit bundle identifier in the circuit bundle identifier column. Configuration manager 136 then compares the circuit type from the command with the circuit bundle type value specified in the retrieved row. If the two type values match, then the virtual circuit is the same type as the circuit bundle.

For example, if the circuit bundle identifier specified in the command is "bndl1", configuration manager 136 retrieves row 281 of circuit bundle table 280 in FIG. 2. The configuration manager then compares the value specified in circuit bundle type column 285, namely "VPLS", with the circuit type parameter value specified by the command. If the circuit type specified by the command is "VPLS", then in this example the virtual circuit is the same type as the circuit bundle.

If the virtual circuit is not the same type as the circuit bundle ("NO" at block 601), the virtual circuit cannot be added to the circuit bundle, and processing proceeds to block 610 and ends.

If the virtual circuit is the same type as the circuit bundle ("YES" at block 601), processing proceeds to block 602 where configuration manager 136 determines whether the virtual circuit is a VPLS circuit, based on the circuit type specified by the command. For example, if the circuit type value is "VPLS", then the virtual circuit is a VPLS circuit.

If the virtual circuit is not a VPLS circuit, ("NO" at block 602), processing proceeds to block 604 where the configuration manager determines whether the circuit bundle already has circuit bundle members. The configuration manager makes this determination by retrieving the row of the circuit bundle table having the circuit bundle identifier in the circuit bundle identifier column, and determining whether either the active virtual circuit column or the inactive virtual circuit column specifies at least one virtual circuit.

For example, if the circuit bundle identifier specified in the command is "bndl1", configuration manager 136 retrieves row 281 of circuit bundle table 280 in FIG. 2. Configuration manager 136 determines whether a value is specified in either active virtual circuit column 283 or inactive virtual circuit column 284. If any value is specified in either column, then the circuit bundle already has circuit bundle members.

If the virtual circuit is a VPLS circuit, ("YES" at block 602), processing proceeds to block 603 where the device determines whether the virtual circuit is associated with the same VPLS instance as the circuit bundle. This determination is made by configuration manager 136. Configuration manager 136 retrieves the row of circuit bundle 280 having the circuit bundle identifier in the circuit bundle identifier column. Configuration manager 136 then compares the VPLS instance specified in the retrieved row with the VPLS instance from the command (or specified in an existing row in circuit table 290 associated with the circuit identifier specified by the command).

For example, if the circuit bundle identifier specified in the command is "bndl1", configuration manager 136 retrieves row 281 of circuit bundle table 280. Configuration manager 136 then compares the value specified in VPLS instance column 286, namely "A", with the VPLS instance specified by the command. If the command specifies VPLS instance "A", then in this example the virtual circuit is associated with the same VPLS instance as the circuit bundle.

If the virtual circuit is not associated with the same VPLS instance as the circuit bundle ("NO" at block 603), processing proceeds to block 610 and ends. If the virtual circuit is associated with the same VPLS instance as the circuit bundle ("YES" at block 603), processing proceeds to block 604 where configuration manager 136 determines whether the circuit bundle has other circuit bundle members, as described above.

If the circuit bundle does not have other circuit bundle members ("NO" at block 604), processing proceeds to block 607 where the device determines whether the specified bundle member is operationally up by checking for notifications indicating that the bundle member has failed, by sending a packet via the bundle member and checking for responsive errors, or by any other suitable means for determining whether a bundle member is operationally up.

If the circuit bundle does have other circuit bundle members ("YES" at block 604), processing proceeds to block 605 where configuration manager 136 determines whether the virtual circuit is associated with the same input and output interfaces (e.g., has the same port-side configuration) as the other bundle members, as specified in a forwarding table (e.g., forwarding table 133 of FIG. 1 or forwarding table 270 of FIG. 2). If the virtual circuit does not have the same port-side configuration ("NO" at block 605), processing proceeds to block 610 and ends.

For example, in forwarding table 270 in FIG. 2, the virtual circuits corresponding to "bndl1" (i.e., bundle members of "bndl1") are the output interfaces corresponding to the input interface associated with interface identifier "ge-1/1/1/1", and the interface associated with interface identifier "ge-1/1/1/1" is the output interface corresponding to "bndl1". If the virtual circuit being added is the input and/or output interface associated with interface identifier "ge-1/1/1/1", then the virtual circuit has the same port-side configuration as the virtual circuits corresponding to "bndl1".

If the virtual circuit has the same port-side configuration ("YES" at block 605), processing proceeds to block 606 where configuration manager 136 determines whether another bundle member is active. Configuration manager 136 makes this determination by retrieving the row of the circuit bundle table having the circuit bundle identifier in the circuit bundle identifier column, and by determining whether the active virtual circuit column specifies a virtual circuit.

For example, if the circuit bundle identifier specified in the command is "bndl1", the configuration manager retrieves row of circuit bundle table 280 specifying "bndl1" in circuit bundle identifier column 282 (e.g., row 281). The configuration manager determines whether a value is specified in active virtual circuit column 283. If a value is specified in active virtual circuit column 283, then another bundle member is active.

If another bundle member is active, ("YES" at block 606), processing proceeds to block 608 where configuration manager 136 adds the virtual circuit as an inactive bundle member, thereafter, processing proceeds to block 610 and ends. For example, configuration manager 136 adds a new row to circuit table 290 of FIG. 2 (or modifies an existing row for the virtual circuit) specifying the circuit identifier in circuit identifier column 294, the circuit type in circuit type column 295, the circuit bundle identifier in circuit bundle identifier column 296, the priority (or the next available priority value if the priority is not specified) in priority column 297, the value "inactive" in status column 298, and the VPLS instance in the VPLS instance column 299.

If another bundle member is not active, ("NO" at block 606), processing proceeds to block 607 where the device determines whether the virtual circuit is operationally up.

If the virtual circuit is operationally up ("YES" at block 607), processing proceeds to block 609 where the device adds the virtual circuit as an active bundle member, thereafter, processing proceeds to block 610 and ends.

For example, configuration manager 136 adds a new row to circuit table 290 (or modifies an existing row for the virtual circuit) specifying the circuit identifier in circuit identifier column 294, the circuit type in circuit type column 295, the circuit bundle identifier in circuit bundle identifier column 296, the priority (or the next available priority value if the priority is not specified) in priority column 297, the value "active" in status column 298, and the VPLS instance in the VPLS instance column 299.

If the virtual circuit is not operationally up ("NO" at block 607), processing proceeds to block 608 where the device adds the virtual circuit as an inactive bundle member, as described above. Thereafter, processing proceeds to block 610 and ends.

In this manner, an active virtual circuit can be added to a circuit bundle for communicating with other devices, and similarly, one or more backup virtual circuits can be added to a circuit bundle to provide communication with the other devices if the active virtual circuit fails.

Figure 7:
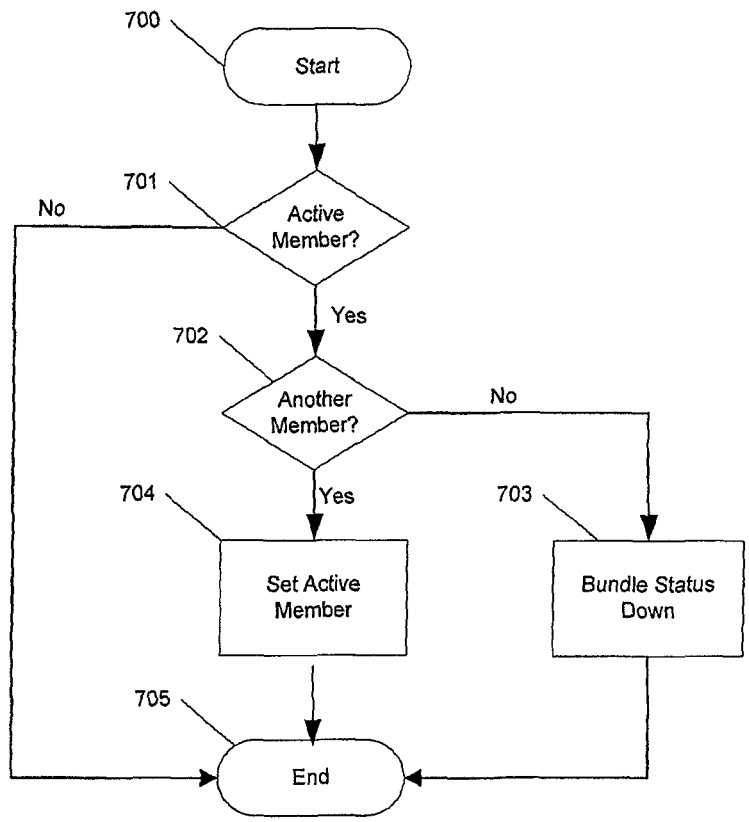
FIG. 7 is a flowchart depicting a process performed by a network device for removing a virtual circuit from a circuit bundle in accordance with an example embodiment of the invention.

FIG. 7 will now be described. FIG. 7 is a flowchart depicting a process performed by a network device (such as, e.g., network device 210 of FIG. 2) for removing a virtual circuit from a circuit bundle in accordance with an example embodiment of the invention.

In block 700, the method starts and proceeds to block 701, where the network device processes a configuration instruction to remove a virtual circuit from a circuit bundle. The instruction is stored in a memory of the device (e.g., program instructions 132 of FIG. 1). For example, the remove virtual circuit instruction can be executed by a processor of the device (such as, e.g., processor 120 of FIG. 1) in response to receiving a configuration instruction from network management software or a user interface, via a configuration interface (e.g., configuration interface 140 shown in FIG. 1), or in response to any other predetermined triggering event. For example, a user can use a command line interface to enter a command to remove a circuit from a circuit bundle by specifying the virtual circuit identifier associated with the virtual circuit to be removed.

In block 701, configuration manager 136 determines whether the virtual circuit is an active bundle member by retrieving the row in the circuit table having the corresponding virtual circuit identifier in the virtual circuit identifier column. Configuration manager 136 then determines whether the status column of the retrieved row indicates that the virtual circuit is active. For example, if the virtual circuit identifier specified in the command is "ckt1", configuration manager 136 retrieves row 291 of circuit table 290 in FIG. 2. Configuration manager 136 determines whether the associated value specified in status column 298 is "active". If the value specified in status column 298 is "active", then the virtual circuit is an active bundle member.

If the virtual circuit is not an active bundle member ("NO" at block 701), the virtual circuit is removed, and thereafter processing proceeds to block 705 and ends. Configuration manager 136 removes the virtual circuit by retrieving the row of the circuit table having the specified virtual circuit identifier in the circuit bundle identifier column, and removing the circuit bundle identifier value from the circuit bundle identifier column. For example, if the virtual circuit identifier specified in the command is "ckt1", configuration manager 136 retrieves row 291 of circuit table 290 in FIG. 2, and sets the value of circuit bundle column 296 to an empty (NULL) value.

If the virtual circuit is an active bundle member ("YES" at block 701), the processing proceeds to block 702 where configuration manager 136 determines whether there is another bundle member that can be activated. Configuration manager 136 makes this determination by retrieving the row of the circuit table having the specified virtual circuit identifier in the circuit bundle identifier column, and retrieving the circuit bundle identifier value from the circuit bundle identifier column. The configuration manager then retrieves the row of the circuit bundle table having the retrieved circuit bundle identifier value in the circuit bundle identifier column, and determines whether the inactive virtual circuit column specifies at least one virtual circuit.

For example, if the virtual circuit identifier parameter value specified in the command is "ckt1", configuration manager 136 retrieves row 291 of circuit table 290 in FIG. 2, and retrieves the value specified in circuit bundle identifier column 296, namely "bndl1". Configuration manager 136 then retrieves row 281 of circuit bundle table 280, having the value "bndl1" in circuit bundle identifier column 282. Since inactive virtual circuit column 284 of row 281 specifies two inactive virtual circuits, namely "ckt2" and ckt3", there are two other bundle members that can be activated after the active virtual circuit is removed from the circuit bundle.

If there is not another bundle member that can be activated ("NO" at block 702), processing proceeds to block 703 where the virtual circuit is removed, as described above, and packets thus cannot be sent or received via the circuit bundle. Thereafter, processing proceeds to block 705 and ends.

For example, if active virtual circuit 251 is removed from circuit bundle 261 in FIG. 2 and virtual circuits 252 and 253 cannot be activated, then packets cannot be sent or received via circuit bundle 261.

If there is another bundle member that can be activated ("YES" at block 702), processing proceeds to block 704 where the virtual circuit is removed, as described above, and another bundle member is activated based on the bundle member's priority value, as described in FIG. 4. For example, if "ckt1" is removed from "bndl1" in FIG. 2, "ckt2" will be activated since its priority value ("2") indicates a greater priority than the "ckt3" priority value ("3"). Thereafter, processing proceeds to block 705 and ends.

In this manner, a virtual circuit can be removed from a circuit bundle if the presence of the virtual circuit in the circuit bundle is no longer desirable, based on operating criteria of the network with which the device is communicatively coupled.

Figure 8:
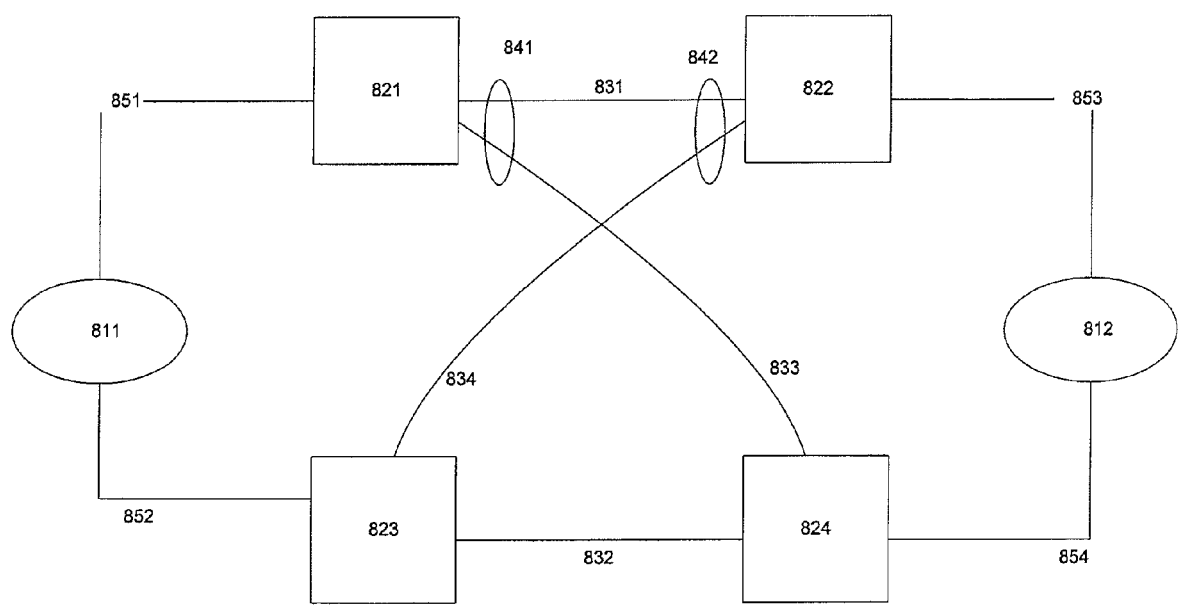
FIG. 8 is a network diagram showing interconnected network devices, configured for providing a point-to-point application, in accordance with an example embodiment of the present invention.

FIG. 8 is a network diagram showing interconnected network devices, configured for providing a point-to-point application, in accordance with an example embodiment of the present invention.

Customer edge devices 811 and 812 provide entry points into at least one core network. Customer edge devices 811 and 812 each include, for example, one or more of a router, switch, routing switch, integrated access device, Internet Protocol telephone, Ethernet unit, video device, computer terminal, digital subscriber line connection, cable modem, wireless access, as well as any other network component(s).

Customer edge device 811 is configured to send and receive packets via links 851 and 852. Customer edge device 812 is configured to send and receive packets via links 853 and 854.

Provider edge devices 821 through 824 each can be the same as, for example, network device 100 of FIG. 1, and can be configured via a communication interface (such as e.g., communication interface 140 of FIG. 1) as described with respect to FIG. 1. Provider edge devices 821 through 824 can perform processes as described in FIGS. 3 through 7. Provider edge devices 821 through 824 provide entry points into a service provider's network, and each include one or more of a router, switch, routing switch, and/or any other network components.

Provider edge device 821 is configured to forward packets received via link 851 through circuit bundle 841, and to forward packets received via circuit bundle 841 through link 851. Provider edge device 822 is configured to forward packets received via link 853 through circuit bundle 842, and to forward packets received via circuit bundle 842 through link 853. Provider edge device 823 is configured to forward packets received via link 852 through virtual circuits 832 and 834, and to forward packets received via virtual circuits 832 and 834 through link 852. Provider edge device 824 is configured to forward packets received via link 854 through virtual circuits 832 and 833, and to forward packets received via virtual circuits 832 and 833 through link 854.

Each virtual circuit 831 through 834 is like the virtual circuits of FIG. 2, and thus will not be described in detail.

Virtual circuits 831, 832, 833, and 834 represent logical paths through a service provider's network through which provider edge devices exchange information.

Virtual circuits 831, 832, 833, and 834 are, for example, all operationally up point-to-point virtual circuits of the same type, such as Ethernet, Interworking Function (IWF), VLAN, VLAN (Q-in-Q), ATM, or Frame Relay circuits, or any other suitable types of point-to-point virtual circuits. Virtual circuit 831 connects provider edge devices 821 and 822, virtual circuit 832 connects provider edge devices 823 and 824, virtual circuit 833 connects provider edge devices 821 and 824, and virtual circuit 834 connects provider edge devices 822 and 823.

Circuit bundles 841 and 842 can be similar to, for example, circuit bundle 261 of FIG. 2, and can be Ethernet, Interworking Function (IWF), VLAN, VLAN (Q-in-Q), ATM, or Frame Relay circuit bundles, or any other suitable types of point-to-point circuit bundles. The circuit bundles and the virtual circuits that form the circuit bundles can be of the same type.

Virtual circuits 831 and 833 form circuit bundle 841 on provider edge device 821, with virtual circuit 831 being an active bundle member and virtual circuit 833 being an inactive bundle member. Virtual circuits 831 and 834 form circuit bundle 842 on provider edge device 822, with virtual circuit 831 being an active bundle member and virtual circuit 834 being an inactive bundle member.

Links 851 through 854 connect customer edge devices to provider edge devices. Links 851 through 854 can be formed by one or more network cables, wireless interfaces, intermediary devices, and/or any other suitable types of linking devices. Link 851 connects customer edge device 811 and provider edge device 821, link 852 connects customer edge device 811 and provider edge device 823, link 853 connects customer edge device 812 and provider edge device 822, and link 854 connects customer edge device 812 and provider edge device 824.

In operation, provider edge devices 821 through 824 forward packets in the manner described in FIG. 3, and detect failures and activate virtual circuits in the manner described in FIG. 4. A packet is sent by customer edge device 811 via either link 851 or 852. Customer edge device 811 uses a link protection mechanism/algorithm, such as, for example, the Spanning Tree Protocol (STP), or any other suitable type of link protection mechanism/algorithm, to determine whether to send the packet via link 851 or 852.

A packet sent by customer edge device 811 via link 851 arrives at provider edge device 821. After receiving the packet, provider edge device 821 forwards the packet through the active bundle member of circuit bundle 841, which is virtual circuit 831, and the packet arrives at provider edge device 822. Since virtual circuit 831 is the active bundle member of circuit bundle 842 on provider edge device 822, provider edge device 822 receives the packet and forwards it to customer edge device 812 via link 853.

A packet sent by customer edge device 811 via link 852 arrives at provider edge device 823. After receiving the packet, provider edge device 823 forwards the packet through virtual circuits 832 and 834, and the packet arrives at provider edge devices 824 and 822, respectively. Provider edge device 824 forwards the packet to customer edge device 812 via link 854. Since virtual circuit 834 is an inactive bundle member of circuit bundle 842 on provider edge device 822, provider edge device 822 drops the packet.

If provider edge devices 821 and 822 detect that virtual circuit 831 fails, provider edge device 821 activates virtual circuit 833 in circuit bundle 841, and provider edge device 822 activates virtual circuit 834 in circuit bundle 842. Thereafter, provider edge device 821 forwards packets received via link 851 through virtual circuit 833, and provider edge device 822 forwards packets received via link 853 through virtual circuit 834.

In this manner, customer edge device 811 and 812 can continue to communicate if one of virtual circuits 831 through 834 fails.

Figure 9:
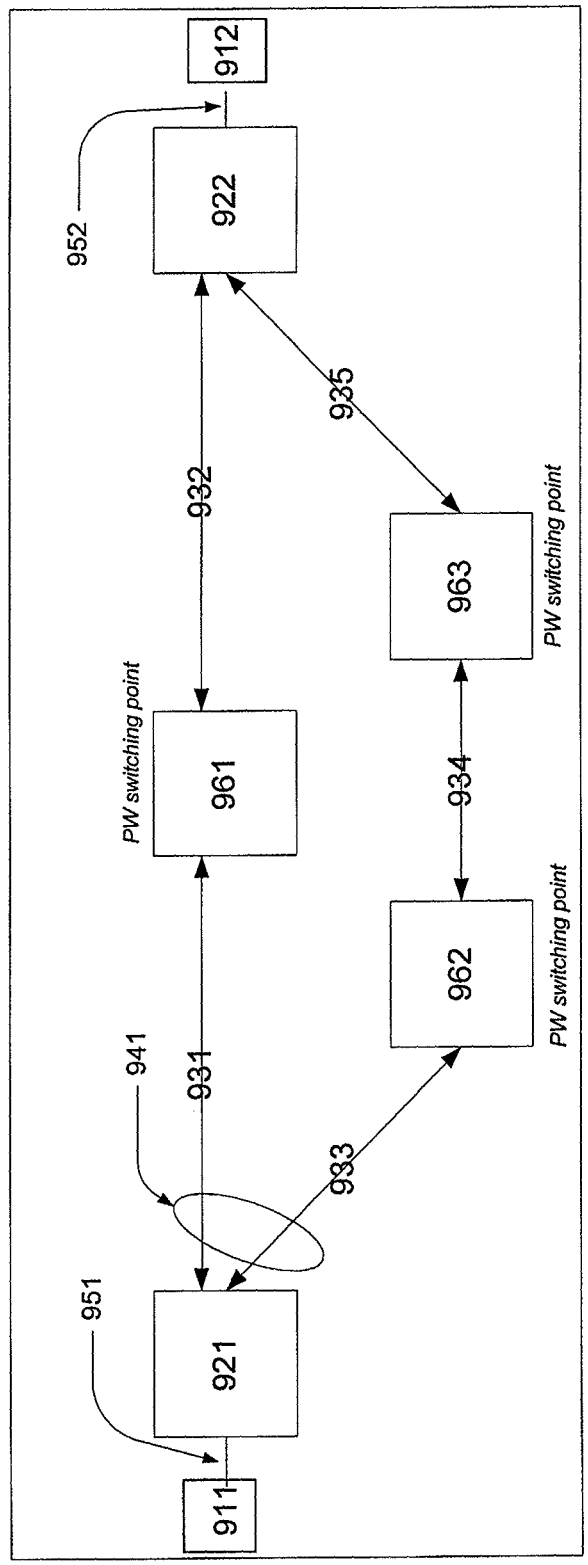
FIG. 9 is a network diagram showing interconnected network devices, configured for providing a point-to-point application across different provider networks, in accordance with an example embodiment of the present invention.

FIG. 9 is a network diagram showing interconnected network devices, configured for providing a point-to-point application across different provider networks, in accordance with an example embodiment of the present invention. A network device can forward packets between a circuit bundle and a link, such as a layer-2 or layer-3 network link. Layer-2 network links, can be, for example, Ethernet, Interworking Function (IWF), Virtual Local Area Network (VLAN), Asynchronous Transfer Mode (ATM), or Frame Relay links, or any other suitable type of layer-2 network links. Layer-3 network links, can be, for example, Internet Protocol (IP) links, or any other suitable type of layer-2 network links.

Customer edge devices 911 and 912 provide entry points into a customer's core network. Customer edge devices 911 and 912 each may include, for example, one or more routers, switches, routing switches, integrated access devices, Internet Protocol telephones, Ethernet units, video devices, computer terminals, digital subscriber line connections, cable modems, wireless access, as well as any other types of network devices.

Customer edge device 911 is communicatively coupled with link 951 and customer edge device 912 is communicatively coupled with link 952.

Ultimate provider edge devices 921 and 922 each can be the same as, for example, network device 100 of FIG. 1, and can be configured via a communication interface (such as e.g., communication interface 140 of FIG. 1) as described above for FIG. 1. Ultimate provider edge devices 921 and 922 can perform processes as described above for FIGS. 3 through 7. Ultimate provider edge devices 921 and 922 provide entry points into a service provider's network, and each include one or more of a router, switch, routing switch, and/or any other network components.

Ultimate provider edge device 921 is configured to forward packets received via link 951 through circuit bundle 941, and to forward packets received via circuit bundle 941 through link 951. Ultimate provider edge device 922 is configured to forward packets received via link 952 through both virtual circuits 932 and 935, and to forward packets received via virtual circuits 932 and 935 through link 952.

Switching provider edge devices 961, 962, and 963 provide entry points from one service provider network into another service provider network. Switching provider edge devices 961, 962, and 963 each can be the same as, for example, network device 100 of FIG. 1, and can be configured via a communication interface (such as e.g., communication interface 140 of FIG. 1) as described above for FIG. 1. Switching provider edge devices 961, 962, and 963 can perform processes as described above for FIGS. 3 through 7. Switching provider edge devices 961, 962, and 963 can include, for example, one or more routers, switches, routing switches, and/or any other suitable types of network devices.

Switching provider edge device 961 is configured to forward packets between virtual circuits 931 and 932. Switching provider edge device 962 is configured to forward packets between virtual circuits 933 and 934. Switching provider edge device 963 is configured to forward packets between virtual circuits 934 and 935.

Virtual circuits 931 through 935 are similar to virtual circuits 251, 252, and 253 of FIG. 2. Virtual circuits 931 through 935 represent logical paths through service provider networks through which provider edge devices exchange information. Virtual circuits 931 through 935 can be implemented using, for example, the Internet Protocol/MultiProtocol Label Switching (IP/MPLS) network protocol.

Virtual circuits 931 through 935 are all operationally up point-to-point virtual circuits of the same type, such as Ethernet, Interworking Function (IWF), VLAN, VLAN (Q-in-Q), ATM, Frame Relay, or any other suitable point-to-point virtual circuit type. Virtual circuit 931 connects ultimate provider edge device 921 and switching provider edge device 961, virtual circuit 932 connects provider switching edge device 961 and ultimate provider edge device 922, virtual circuit 933 connects ultimate provider edge device 921 and switching provider edge device 962, virtual circuit 934 connects switching provider edge devices 962 and 963, and virtual circuit 935 connects switching provider edge device 963 and ultimate provider edge device 922.

Circuit bundle 941 can be similar to, for example, circuit bundle 261 of FIG. 2. Circuit bundle 941 can be an Ethernet, Interworking Function (IWF), VLAN, VLAN (Q-in-Q), ATM, or Frame Relay circuit bundle, or any other suitable type of point-to-point circuit bundle. The circuit bundle and the virtual circuits that form the circuit bundle can be of the same type.

Virtual circuits 931 and 933 form circuit bundle 941 on ultimate provider edge device 921, with virtual circuit 931 being an active bundle member and virtual circuit 933 being an inactive bundle member.

Links 951 and 952 connect customer edge devices to ultimate provider edge devices. Links 951 and 952 can be layer-2 or layer-3 network links formed by network cables, wireless interfaces, intermediary devices, and/or any other suitable types of linking devices. Link 951 connects customer edge device 911 and ultimate provider edge device 921, and link 952 connects customer edge device 912 and ultimate provider edge device 922.

In operation, ultimate provider edge devices 921 and 922, and switching provider edge devices 961, 962, and 963 forward packets in the manner described above with respect to FIG. 3, and detect failures and activate virtual circuits in the manner described above with respect to FIG. 4.

A packet sent by customer edge device 911 via link 951 arrives at ultimate provider edge device 921. After receiving the packet, ultimate provider edge device 921 forwards the packet through the active bundle member of circuit bundle 941, which is virtual circuit 931, and the packet arrives at switching provider edge device 961. Switching provider edge device 961 forwards the packet to ultimate provider edge device 922, and ultimate provider edge device 922 forwards the packet to customer edge device 912 via link 952.

A packet sent by customer edge device 912 via link 952 arrives at ultimate provider edge device 922. After receiving the packet, ultimate provider edge device 922 forwards the packet through virtual circuits 932 and 935, and the packet arrives at switching provider edge devices 961 and 963, respectively.

Switching provider edge device 961 forwards the packet it receives through virtual circuit 931, and the packet arrives at ultimate provider edge device 921. Since virtual circuit 931 is the active bundle member of circuit bundle 941 on ultimate provider edge device 921, ultimate provider edge device 921 receives the packet and forwards it to customer edge device 911 via link 951.

Switching provider edge device 963 forwards the packet through virtual circuit 934, and the packet arrives at switching provider edge device 962. After receiving the packet, switching provider edge device 962 forwards the packet through virtual circuit 933, and the packet arrives at ultimate provider edge device 921. Since virtual circuit 933 is an inactive bundle member of circuit bundle 941 on ultimate provider edge device 921, ultimate provider edge device 921 drops the packet.

If virtual circuit 931 fails, ultimate provider edge device 921 activates virtual circuit 933 in circuit bundle 941. Thereafter, ultimate provider edge device 921 forwards packets received via link 951 through virtual circuit 933.

In this manner, customer edge devices 911 and 912 can continue to communicate across multiple provider networks if one of virtual circuits 931 through 935 fails.

Figure 10:
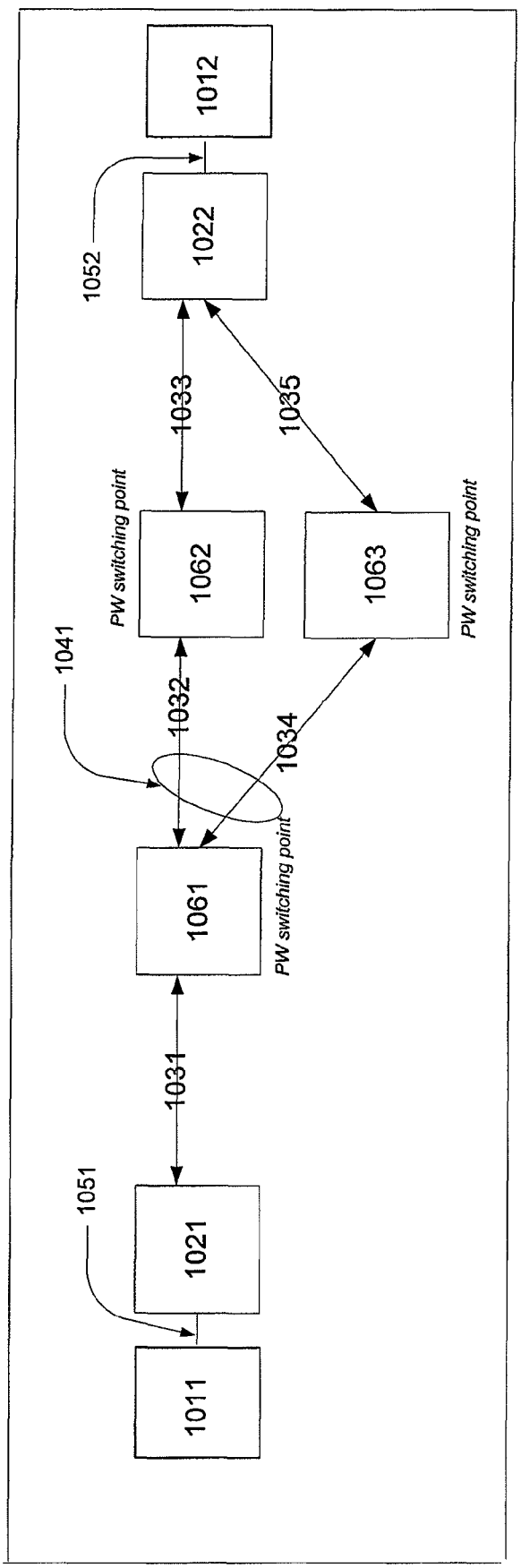
FIG. 10 is a network diagram showing interconnected network devices, configured for providing a point-to-point application across different provider networks, in accordance with an example embodiment of the present invention.

FIG. 10 is a network diagram showing interconnected network devices, configured for providing a point-to-point application across different provider networks, in accordance with an example embodiment of the present invention. In FIG. 10 a network device forwards packets between a circuit bundle and a point-to-point virtual circuit (e.g., Martini circuit (pseudowire)).

Customer edge devices 1011 and 1012 provide entry points into a customer's core network. Customer edge devices 1011 and 1012 each may include, for example, one or more routers, switches, routing switches, integrated access devices, Internet Protocol telephones, Ethernet units, video devices, computer terminals, digital subscriber line connections, cable modems, wireless access, as well as any other types of network devices.

Customer edge device 1011 is communicatively coupled with link 1051 and customer edge device 1012 is communicatively coupled with link 1052.

Ultimate provider edge devices 1021 and 1022 each can be the same as, for example, network device 100 of FIG. 1, and can be configured via a communication interface (such as e.g., communication interface 140 of FIG. 1) as described above for FIG. 1. Ultimate provider edge devices 1021 and 1022 can perform processes as described above for FIGS. 3 through 7. Ultimate provider edge devices 1021 and 1022 provide entry points into a service provider's network, and each include one or more of a router, switch, routing switch, and/or any other network components.

Ultimate provider edge device 1021 is configured to forward packets received via link 1051 through virtual circuit bundle 1031, and to forward packets received via virtual circuit 1031 through link 1051. Ultimate provider edge device 1022 is configured to forward packets received via link 1052 through both virtual circuits 1033 and 1035, and to forward packets received via virtual circuits 1033 and 1035 through link 1052.

Switching provider edge devices 1061, 1062, and 1063 provide entry points from one service provider network into another service provider network. Switching provider edge devices 1061, 1062, and 1063 each can be the same as, for example, network device 100 of FIG. 1, and can be configured via a communication interface (such as e.g., communication interface 140 of FIG. 1) as described above for FIG. 1. Switching provider edge devices 1061, 1062, and 1063 can perform processes as described above for FIGS. 3 through 7. Switching provider edge devices 1061, 1062, and 1063 can include, for example, one or more routers, switches, routing switches, and/or any other suitable types of network devices.

Switching provider edge device 1061 is configured to forward packets received via virtual circuit 1031 through circuit bundle 1041, and forward packets received via circuit bundle 1041 through virtual circuit 1031. Switching provider edge device 1062 is configured to forward packets between virtual circuits 1032 and 1033. Switching provider edge device 1063 is configured to forward packets between virtual circuits 1034 and 1035.

Virtual circuits 1031 through 1035 can be similar to, for example, virtual circuits 251, 252, and 253 of FIG. 2. Virtual circuits 1031 through 1035 represent logical paths through service provider networks through which provider edge devices exchange information. Virtual circuits 1031 through 1035 can be implemented using, for example, the Internet Protocol/MultiProtocol Label Switching (IP/MPLS) network protocol.

Virtual circuits 1031 through 1035 are all operationally up point-to-point virtual circuits of the same type, such as Ethernet, Interworking Function (IWF), VLAN, VLAN (Q-in-Q), ATM, Frame Relay, or any other suitable point-to-point virtual circuit type. Virtual circuit 1031 connects ultimate provider edge device 1021 and switching provider edge device 1061, virtual circuit 1032 connects switching provider edge device 1061 and switching provider edge device 1062, virtual circuit 1033 connects ultimate provider edge device 1022 and switching provider edge device 1062, virtual circuit 1034 connects switching provider edge devices 1061 and 1063, and virtual circuit 1035 connects switching provider edge device 1063 and ultimate provider edge device 1022.

Circuit bundle 1041 can be similar to, for example, circuit bundle 261 of FIG. 2. Circuit bundle 1041 may be an Ethernet, Interworking Function (IWF), VLAN, VLAN (Q-in-Q), ATM, or Frame Relay circuit bundle, or any other suitable type of point-to-point circuit bundle. The circuit bundle and the virtual circuits that form the circuit bundle can be of the same type.

Virtual circuits 1032 and 1034 form circuit bundle 1041 on switching provider edge device 1061, with virtual circuit 1032 being an active bundle member and virtual circuit 1034 being an inactive bundle member.

Links 1051 and 1052 connect customer edge devices to ultimate provider edge devices. Links 1051 and 1052 can be layer-2 or layer-3 links formed by network cables, wireless interfaces, intermediary devices, and/or any other suitable types of linking devices. Link 1051 connects customer edge device 1011 and ultimate provider edge device 1021, and link 1052 connects customer edge device 1012 and ultimate provider edge device 1022.

In operation, ultimate provider edge devices 1021 and 1022, and switching provider edge devices 1061, 1062, and 1063 forward packets in the manner described above with respect to FIG. 3, and detect failures and activate virtual circuits in the manner described above with respect to FIG. 4.

A packet sent by customer edge device 1011 via link 1051 arrives at ultimate provider edge device 1021. After receiving the packet, ultimate provider edge device 1021 forwards the packet through virtual circuit 1031, and the packet arrives at switching provider edge device 1061. Switching provider edge device 1061 forwards the packet through the active bundle member of circuit bundle 1041, which in this example is virtual circuit 1032, and the packet arrives at switching provider edge device 1062. After receiving the packet, switching provider edge device 1062 forwards the packet to ultimate provider edge device 1022, and ultimate provider edge device 1022 forwards the packet to customer edge device 1012 via link 1052.

A packet sent by customer edge device 1012 via link 1052 arrives at ultimate provider edge device 1022. After receiving the packet, ultimate provider edge device 1022 forwards the packet through virtual circuits 1033 and 1035, and the packet arrives at switching provider edge devices 1062 and 1063, respectively.

Switching provider edge device 1062 forwards the packet through virtual circuit 1032, and the packet arrives at switching provider edge device 1061. Since virtual circuit 1032 is the active bundle member of circuit bundle 1041 on switching provider edge device 1061, switching provider edge device 1061 receives the packet and forwards it to ultimate provider edge device 1021. Thereafter, ultimate provider edge device 1021 forwards the packet to customer edge device 1011 via link 1051.

After receiving a packet from ultimate provider edge device 1022, switching provider edge device 1063 forwards the packet through virtual circuit 1034, and the packet arrives at switching provider edge device 1061. Since virtual circuit 1034 is an inactive bundle member of circuit bundle 1041 on switching provider edge device 1061, switching provider edge device 1061 drops the packet.

If virtual circuit 1032 fails, switching provider edge device 1061 activates virtual circuit 1034 in circuit bundle 1041. Thereafter, switching provider edge device 1061 forwards packets received via virtual circuit 1031 through virtual circuit 1034.

In this manner, customer edge devices 1011 and 1012 can continue to communicate across multiple provider networks if one of virtual circuits 1032 through 1035 fails.

Figure 11:
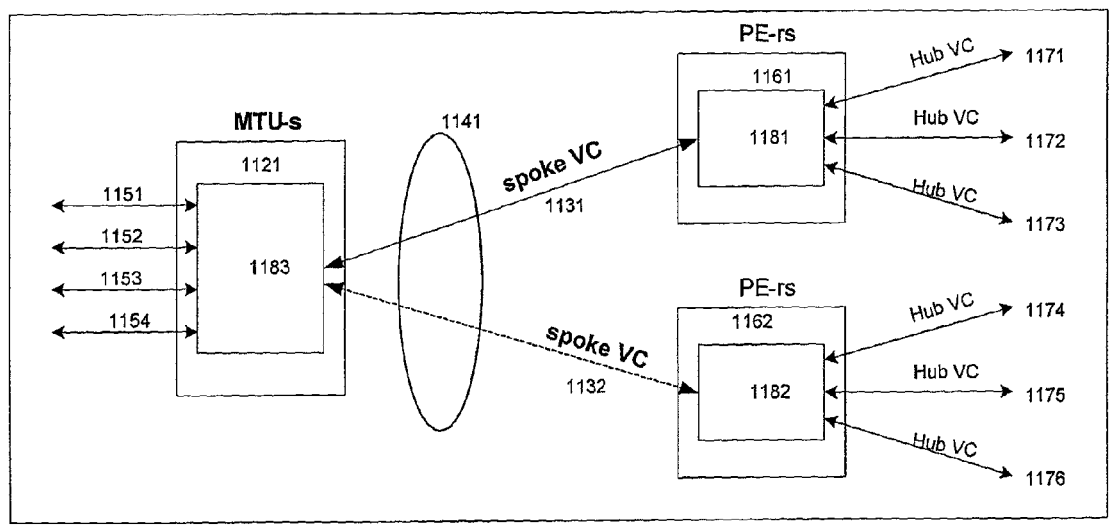
FIG. 11 is a network diagram showing interconnected network devices, configured for providing a dual-homed multipoint-to-multipoint application using a Multi-Tenant Unit, in accordance with an example embodiment of the present invention.

FIG. 11 is a network diagram showing interconnected network devices, configured for providing a dual-homed multipoint-to-multipoint application using a Multi-Tenant Unit, in accordance with an example embodiment of the present invention. A hierarchical VPLS (HVPLS) multipoint-to-multipoint application where a Multi-Tenant Unit (MTU) is dual-homed into two provider edge devices which belong to the same VPLS domain, is represented in the example of FIG. 11.

MTU 1121 can be similar to, for example, network device 100 of FIG. 1. MTU 1121 provides multiple service provider customers an entry point into the service provider's HVPLS access network. MTU 1121 has one or more VPLS instances, such as VPLS instance 1183, for each customer. MTU 1121 is a bridge-capable MTU device, but in other embodiments, it may be any other suitable type of MTU device.

Provider edge devices 1161 and 1162 are similar to, for example, network device 100 of FIG. 1. Provider edge devices 1161 and 1162 provide other provider edge devices or MTU's, such as MTU 1121, entry points into the service provider's HVPLS backbone network. Provider edge devices 1161 and 1162 have one or more VPLS instances, such as VPLS instances 1181 and 1182, respectively. Provider edge devices 1161 and 1162 are routing-and-bridging capable provider edge devices, but in other embodiments, they may be any other suitable type of provider edge devices.

VPLS instances 1181, 1182, and 1183 are program instructions stored in a memory of a MTU (e.g., MTU 1121) or provider edge device (e.g., provider edge devices 1161 and 1162) and executed by a processor. VPLS instances 1181, 1182, and 1183 create Ethernet Media Access Control (MAC) address tables and enable the MTU or provider edge device to act as an Ethernet switch or bridge and participate in a virtual LAN (e.g., a VPLS domain) composed of multiple VPLS instances, each instance running on a unique network device. Each VPLS instance has a forwarding table, similar to forwarding table 133 of FIG. 1, that maps input interfaces to output interfaces. VPLS instances 1181, 1182, and 1183 belong to the same VPLS domain.

VPLS instance 1183 on MTU 1121 maps the interfaces associated with Ethernet link 1151, VLAN link 1152, ATM link 1153, and Frame Relay (FR) link 1154 to the interfaces associated with circuit bundle 1141. The MAC address table of VPLS instance 1183 associates a MAC address with each of Ethernet link 1151, VLAN link 1152, ATM link 1153, and Frame Relay (FR) link 1154.

VPLS instance 1181 on provider edge device 1161 maps the interface associated with spoke virtual circuit 1131 to the interfaces associated with hub virtual circuits 1171, 1172, and 1173. The MAC address table of VPLS instance 1181 associates a MAC address with each of hub virtual circuits 1171, 1172, and 1173.

VPLS instance 1182 on provider edge device 1162 maps the interface associated with spoke virtual circuit 1132 to the interfaces associated with hub virtual circuits 1174, 1175, and 1176. The MAC address table of VPLS instance 1182 associates a MAC address with each of hub virtual circuits 1174, 1175, and 1176.

Virtual circuits 1171 through 1176 are similar to virtual circuits 251, 252, and 253 of FIG. 2. Virtual circuits 1171 through 1176 are logical paths through a service provider's backbone network (i.e., hub virtual circuits) through which provider edge devices exchange information. Hub virtual circuits 1171 through 1176 can be implemented using the Internet Protocol/MultiProtocol Label Switching (IP/MPLS) network protocol, for example.

Hub virtual circuits 1171 through 1176 can be, for example, operationally up multipoint-to-multipoint virtual circuits of the VPLS type, or any other suitable type of multipoint-to-multipoint virtual circuit. Hub virtual circuits 1171, 1172, and 1173 connect provider edge device 1161 to other devices (not shown) in the service provider's backbone network. Hub virtual circuits 1174, 1175, and 1176 connect provider edge device 1162 to other devices in the service provider's backbone network (not shown).

Virtual circuits 1131 and 1132 are similar to virtual circuits 251, 252, and 253 of FIG. 2. Virtual circuits 1131 and 1132 are logical paths through a service provider's access network (i.e., spoke virtual circuits) through which MTU's and provider edge devices exchange information. Spoke virtual circuits 1131 and 1132 can be implemented using the Internet Protocol/MultiProtocol Label Switching (IP/MPLS) network protocol, for example.

Spoke virtual circuits 1131 and 1132 can be both, for example, operationally up multipoint-to-multipoint virtual circuits of the type VPLS, or any other suitable type of multipoint-to-multipoint virtual circuit. Spoke virtual circuit 1131 connects MTU 1121 and provider edge device 1161, and spoke virtual circuit 1132 connects MTU 1121 and provider edge device 1162.

Circuit bundle 1141 is similar to circuit bundle 261 of FIG. 2. Circuit bundle 1141 can be a VPLS, or any other suitable multipoint-to-multipoint circuit bundle type. The circuit bundle and the virtual circuits that form the circuit bundle can be of the same type.

Spoke virtual circuits 1131 and 1132 form circuit bundle 1141 on MTU 1121, with spoke virtual circuit 1131 being an active bundle member and spoke virtual circuit 1132 being an inactive bundle member. Circuit bundle 1141 and spoke virtual circuits 1131 and 1132 are associated with VPLS instance 1183.

Links 1151 through 1154 are layer-2 network links that connect customer edge devices (not shown) to MTU's, but in other embodiments, they can be layer-3 network links or any other suitable types of network links. Link 1151 is an Ethernet network link, link 1152 is a Virtual Local Area Network (VLAN) network link, link 1153 is an Asynchronous Transfer Mode (ATM) network link, and link 1154 is a Frame Relay (FR) network link. Links 1151 through 1154 can be formed by, one or more network cables, wireless interfaces, intermediary devices, and/or any other suitable types of linking components.

In operation, MTU 1121 and provider edge devices 1161 and 1162 forward packets in the manner described above for FIG. 3, and detect failures and activate virtual circuits in the manner described above for FIG. 4.

MTU 1121 forwards a packet received at either link 1151, 1152, 1153, or 1154 through the active bundle member of circuit bundle 1141, which is spoke virtual circuit 1131, and the packet arrives at provider edge device 1161. After receiving the packet, provider edge device 1161 gets the destination MAC address from the packet, looks up the destination MAC address in the MAC address table for VPLS instance 1181, and forwards the packet through the hub virtual circuit (e.g., 1171, 1172, and/or 1173) associated with the destination MAC address. If the destination MAC address is not in the MAC address table for VPLS instance 1181, the packet is replicated and forwarded through hub virtual circuits 1171, 1172, and 1173.

Provider edge 1161 also forwards a packet (not shown) received at either hub virtual circuit 1171, 1172, or 1173 through spoke virtual circuit 1131, and the packet arrives at MTU 1121. Since spoke virtual circuit 1131 is the active bundle member of circuit bundle 1141 on MTU 1121, MTU 1121 gets the destination MAC address from the packet, looks up the destination MAC address in the MAC address table for VPLS instance 1183. If the destination MAC address is in the MAC address table, MTU 1121 forwards the packet through the link (e.g., 1151, 1152, 1153, and/or 1154) associated with the destination MAC address. If the destination MAC address is not in the MAC address table, MTU 1121 forwards the packet through links 1151, 1152, 1153, and 1154.

Provider edge 1162 forwards a packet (not shown) received at either hub virtual circuit 1174, 1175, or 1176 through spoke virtual circuit 1132, and the packet arrives at MTU 1121. Since spoke virtual circuit 1132 is an inactive bundle member of circuit bundle 1141 on MTU 1121, MTU 1121 drops the packet.

If spoke virtual circuit 1131 fails, MTU 1121 activates spoke virtual circuit 1132 in circuit bundle 1141. If circuit bundle 1141 is configured to send a MAC address withdraw message, as described above for FIG. 5, MTU 1121 sends a MAC address withdraw message to provider edge device 1162, via spoke virtual circuit 1132. After receiving the MAC address withdraw message, provider edge device 1162 removes potentially invalid MAC addresses by removing all MAC addresses from the MAC address table for VPLS instance 1182. Because MAC addresses retrieved from packets received via spoke virtual circuit 1132 are presumably valid, these MAC addresses do not need to be removed from the MAC address table. Thereafter, provider edge device 1162 forwards the MAC address withdraw message, via hub virtual circuits 1174, 1175, and 1176, to other provider edge devices with VPLS instances in the same VPLS domain as VPLS instance 1182.

In this manner, MTU 1121 can continue to communicate through the service provider's backbone network if one of spoke virtual circuits 1131 or 1132 fails.

Figure 12:
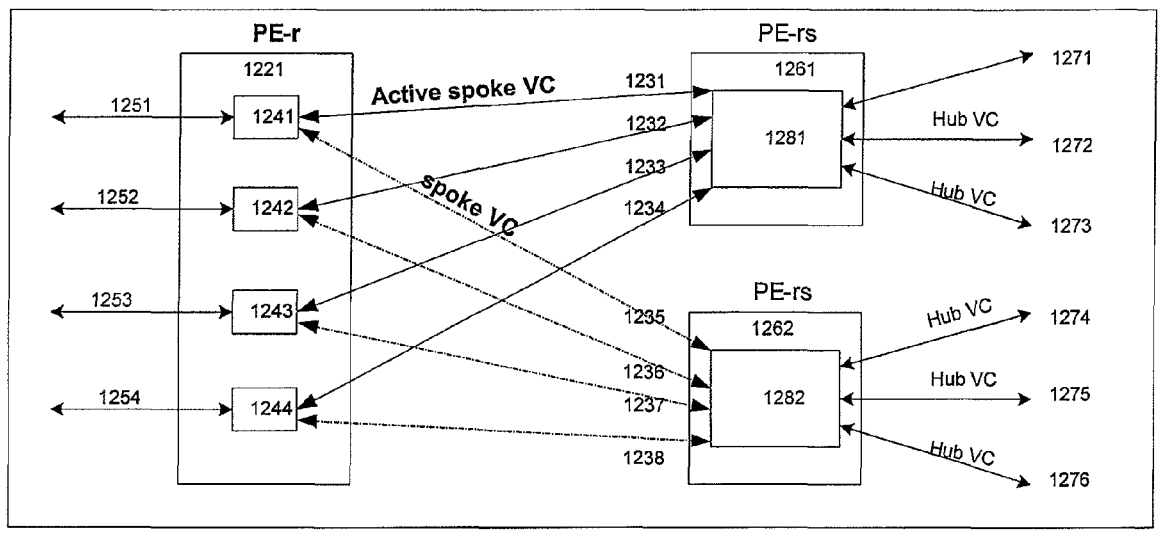
FIG. 12 is a network diagram showing interconnected network devices, configured for providing a dual-homed multipoint-to-multipoint application using a non-bridging capable provider edge device, in accordance with an example embodiment of the present invention.

FIG. 12 is a network diagram showing interconnected network devices, configured for providing a dual-homed multipoint-to-multipoint application using a non-bridging-capable provider edge device, in accordance with an example embodiment of the present invention. A hierarchical VPLS (HVPLS) multipoint-to-multipoint application, is represented, where a non-bridging-capable provider edge device is dual-homed into two routing and bridging capable provider edge devices which belong to the same VPLS domain.

Provider edge device 1221 can be similar to, for example network device 100 of FIG. 1. Provider edge device 1221 is a non-bridging capable provider edge device, and therefore does not have a VPLS instance. The forwarding table of provider edge device 1221 maps the interfaces associated with Ethernet link 1251, VLAN link 1252, ATM link 1253, and Frame Relay (FR) link 1254 to the interfaces associated with circuit bundles 1241, 1242, 1243, and 1244, respectively.

Provider edge devices 1261 and 1262 are similar to network device 100 as previously described in the detailed description of FIG. 1. Provider edge devices 1261 and 1262 provide other provider edge devices or MTU's, such as MTU 1121 of FIG. 11, entry points into the service provider's HVPLS backbone network. Provider edge devices 1261 and 1262 have one or more VPLS instances, such as VPLS instances 1281 and 1282, respectively. Provider edge devices 1261 and 1262 are routing and bridging capable provider edge devices, but in other embodiments, they may be any other suitable type of provider edge device.

VPLS instances 1281 and 1282 are program instructions stored in a memory of a provider edge device (e.g., provider edge devices 1261 and 1262) and executed by a processor. VPLS instances 1281 and 1282 create Ethernet Media Access Control (MAC) address tables and enable the provider edge device to act as an Ethernet switch or bridge and participate in a virtual LAN (e.g., a VPLS domain) composed of multiple VPLS instances, each instance running on a unique network device. Each VPLS instance has a forwarding table, similar to forwarding table 133 of FIG. 1, that maps input interfaces to output interfaces. VPLS instances 1281 and 1282 belong to the same VPLS domain.

VPLS instance 1281 on provider edge device 1261 maps the interfaces associated with each of spoke virtual circuits 1231 through 1234 to the interfaces associated with hub virtual circuits 1271, 1272, and 1273. The MAC address table of VPLS instance 1281 associates a MAC address with each of spoke virtual circuits 1231 through 1234 and hub virtual circuits 1271, 1272, and 1273.

VPLS instance 1282 on provider edge device 1262 maps the interfaces associated with each of spoke virtual circuits 1235 through 1238 to the interfaces associated with hub virtual circuits 1274, 1275, and 1276. The MAC address table of VPLS instance 1282 associates a MAC address with each of spoke virtual circuits 1235 through 1238 and hub virtual circuits 1274, 1275, and 1276.

Virtual circuits 1271 through 1276 are similar to, for example, virtual circuits 251, 252, and 253 as previously described in the detailed description of FIG. 2. Virtual circuits 1271 through 1276 are logical paths through a service provider's backbone network (i.e. hub virtual circuits) through which provider edge devices exchange information. Hub virtual circuits 1271 through 1276 can be implemented using the Internet Protocol/MultiProtocol Label Switching (IP/MPLS) network protocol, for example.

Hub virtual circuits 1271 through 1276 can be, for example, operationally up multipoint-to-multipoint virtual circuits of the VPLS type, or any other suitable type of multipoint-to-multipoint virtual circuits. Hub virtual circuits 1271, 1272, and 1273 connect provider edge device 1261 to other devices (not shown) in the service provider's backbone network. Hub virtual circuits 1274, 1275, and 1276 connect provider edge device 1262 to other devices in the service provider's backbone network (not shown).

Virtual circuits 1231 through 1238 can be similar to, for example, virtual circuits 251, 252, and 253 of FIG. 2. Virtual circuits 1231 through 1238 are logical paths through a service provider's access network (i.e., spoke virtual circuits) through which MTU's and provider edge devices exchange information. Spoke virtual circuits 1231 through 1238 can be implemented using the Internet Protocol/MultiProtocol Label Switching (IP/MPLS) network protocol, for example.

Spoke virtual circuits 1231 through 1238 are all operationally up point-to-point virtual circuits of the same type, such as Ethernet, Interworking Function (IWF), VLAN, VLAN (Q-in-Q), ATM, Frame Relay, or any other suitable point-to-point virtual circuit type. Spoke virtual circuits 1231 through 1234 connect provider edge device 1221 and provider edge device 1261, and spoke virtual circuits 1235 through 1238 connect provider edge device 1221 and provider edge device 1262.

Circuit bundles 1241 through 1244 can be similar to, for example, circuit bundle 261 of FIG. 2. Circuit bundles 1241 through 1244 can be an Ethernet, Interworking Function (IWF), VLAN, VLAN (Q-in-Q), ATM, Frame Relay circuit bundle type, or any other suitable point-to-point circuit bundle type. The circuit bundles and the virtual circuits that form the circuit bundle can be of the same type.

Spoke virtual circuits 1231 and 1235 form circuit bundle 1241 on provider edge device 1221, with spoke virtual circuit 1231 being the active bundle member and spoke virtual circuit 1235 being an inactive bundle member. Spoke virtual circuits 1232 and 1236 form circuit bundle 1242 on provider edge device 1221, with spoke virtual circuit 1232 being an active bundle member and spoke virtual circuit 1236 being an inactive bundle member. Spoke virtual circuits 1233 and 1237 form circuit bundle 1243 on provider edge device 1221, with spoke virtual circuit 1233 being an active bundle member and spoke virtual circuit 1237 being an inactive bundle member. Spoke virtual circuits 1234 and 1238 form circuit bundle 1244 on provider edge device 1221, with spoke virtual circuit 1234 being an active bundle member and spoke virtual circuit 1238 being an inactive bundle member.

Links 1251 through 1254 can be layer-2 network links that connect customer edge devices (not shown) to provider edge devices (e.g., provider edge device 1221), but in other embodiments, they can be layer-3 network links or any other suitable types of network links. In the present example, link 1251 is an Ethernet network link, link 1252 is a Virtual Local Area Network (VLAN) network link, link 1253 is an Asynchronous Transfer Mode (ATM) network link, and link 1254 is a Frame Relay (FR) network link. Links 1251 through 1254 can be formed by one or more network cables, wireless interfaces, intermediary devices, and/or any other suitable types of linking components.

In operation, provider edge devices 1221, 1261, and 1262 forward packets in the manner described with respect to FIG. 3, and detect failures and activate virtual circuits in the manner described above with respect to FIG. 4.

Provider edge device 1221 forwards packets received at links 1251, 1252, 1253, and 1254 through the active bundle members of circuit bundles 1241, 1242, 1243, and 1244 (e.g., spoke virtual circuits 1231, 1232, 1233, and 1234), respectively. Packets sent through either spoke virtual circuit 1231, 1232, 1233, or 1234 arrive at provider edge device 1261. After receiving a packet, provider edge device 1261 gets the destination MAC address from the packet, looks up the destination MAC address in the MAC address table for VPLS instance 1281, and forwards the packet through the hub virtual circuit (e.g., 1271, 1272, and/or 1273) associated with the destination MAC address. If the destination MAC address is not in the MAC address table for VPLS instance 1281, the packet is replicated and forwarded through hub virtual circuits 1271, 1272, and 1273.

After receiving a packet at either hub virtual circuit 1271, 1272, or 1273, provider edge 1261 gets the destination MAC address from the packet, looks up the destination MAC address in the MAC address table for VPLS instance 1281, and forwards the packet to provider edge device 1221, through the spoke virtual circuit (e.g., 1231, 1232, 1233, and/or 1234) associated with the destination MAC address. If the destination MAC address is not in the MAC address table for VPLS instance 1281, the packet is replicated and forwarded to provider edge 1221 through spoke virtual circuits 1231 through 1234.

Since spoke virtual circuits 1231 through 1234 are the active bundle members of circuit bundles 1241 through 1244, respectively, on provider edge device 1221, provider edge device 1221 forwards the packet through the link (e.g., 1251, 1252, 1253, and/or 1254) associated with the spoke virtual circuit through which the packet was received.

For example, provider edge device 1221 forwards a packet received via virtual circuit 1231 through link 1251, a packet received via virtual circuit 1232 through link 1252, a packet received via virtual circuit 1233 through link 1253, and a packet received via virtual circuit 1234 through link 1254.

After receiving a packet at either hub virtual circuit 1274, 1275, or 1276, provider edge 1262 gets the destination MAC address from the packet, looks up the destination MAC address in the MAC address table for VPLS instance 1282, and forwards the packet to provider edge device 1221, through the spoke virtual circuit (e.g., 1235, 1236, 1237, and/or 1238) associated with the destination MAC address. If the destination MAC address is not in the MAC address table for VPLS instance 1282, the packet is replicated and forwarded to provider edge 1221 through spoke virtual circuits 1235 through 1238.

Since spoke virtual circuits 1235 through 1238 are inactive bundle members of circuit bundles 1241 through 1244, respectively, on provider edge device 1221, provider edge device 1221 drops the packet.

If a bundle member specified in the active virtual circuit column (e.g., 283) of a circuit bundle table (e.g., 280) of any of circuit bundles 1241 through 1244 fails (e.g., spoke virtual circuits 1231 through 1234), as determined by a packet switch of provider edge 1221, provider edge device 1221 activates an inactive bundle member for that circuit bundle (e.g., spoke virtual circuits 1235 through 1238). If the circuit bundle is configured to send a MAC address withdraw message, as described above for FIG. 5, provider edge device 1221 sends a MAC address withdraw message to provider edge device 1262 for removing potentially invalid MAC addresses from the MAC address table for VPLS instance 1282, via the newly activated bundle member.

For example, if spoke virtual circuit 1231, in circuit bundle 1241, fails, provider edge device 1221 activates spoke virtual circuit 1235. If circuit bundle 1241 is configured to send a MAC address withdraw message, provider edge device 1221 sends a MAC address withdraw message to provider edge device 1262, via spoke virtual circuit 1235.

After receiving a MAC address withdraw message, provider edge device 1262 removes all MAC addresses not retrieved from packets received via spoke virtual circuit 1235 from the MAC address table for VPLS instance 1282. Thereafter, provider edge device 1262 forwards the MAC address withdraw message, via hub virtual circuits 1274, 1275, and 1276, to other provider edge devices with VPLS instances in the same VPLS domain as VPLS instance 1282, instructing them to remove MAC addresses from their MAC address tables.

In this manner, provider edge device 1221 can continue to communicate through the service provider's backbone network if one or more of spoke virtual circuits 1231 through 1238 fails.

Figure 13:
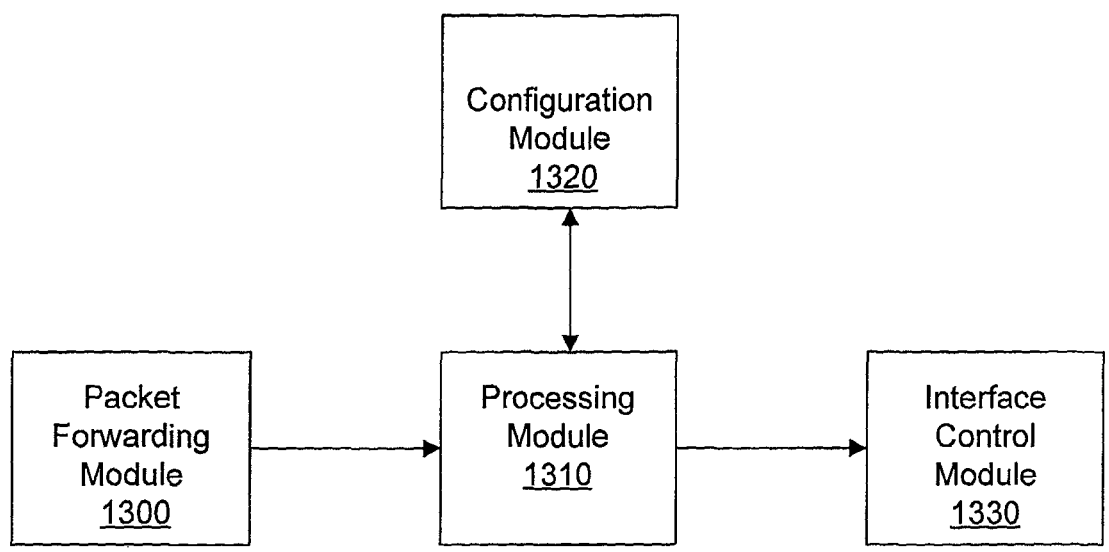
FIG. 13 is a logical diagram of modules in accordance with an example embodiment of the invention.

FIG. 13 is a logical diagram of modules in accordance with an example embodiment of the invention. The modules may be of a network device like the network device of FIG. 1. The modules may be implemented using hardcoded computational modules or other types of circuitry, or a combination of software and circuitry modules.

Packet forwarding module 1300 processes packets received at network interfaces 101 through 106 of FIG. 1, for example. Packet forwarding module 1300 can add or remove packet headers, verify packets, detect network failures at network interfaces 101 through 106, and forward packets received at one of network interfaces 101 through 106, through another of network interfaces 101 through 106.

Interface control module 1330 controls network interfaces 101 through 106 by processing interface commands. Interface commands may be, for example, commands to send data, commands to activate or deactivate an interface, or any other suitable type of interface command.

Configuration module 1320 stores and retrieves configuration data (e.g., configuration data 131, forwarding table 133, circuit bundle table 134, and circuit table 135 of FIG. 1) in response to requests from processing module 1310.

Processing module 1310 processes failures detected by packet forwarding module 1300, based on the configuration data retrieved from configuration module 1320, and sends the appropriate interface commands, if any, to interface control module 1330. Processing module 1310 also processes configuration instructions received via configuration interface 140 of FIG. 1.

In operation, if processing module 1310 receives a configuration instruction via configuration interface 140 for creating a circuit bundle, adding a virtual circuit, or removing a virtual circuit, processing module 1310 executes the instruction as described above for FIGS. 5, 6, and 7, respectively.

If packet forwarding module 1300 detects a network failure at an interface associated with a circuit bundle, it responds by notifying processing module 1310 that it has detected a network failure. Processing module 1310 then responds by issuing a request to configuration module 1320 for retrieving the row of the circuit bundle table (such as, e.g., circuit bundle table 280 of FIG. 2) corresponding to the circuit bundle to see if inactive bundle members are specified. If one or more inactive bundle members do exist, processing module 1310 (after being notified by module 1320) sends interface control module 1330 an interface command for activating the interface associated with the operationally up (i.e., capable of sending and receiving packets) bundle member that has the highest priority, as described with respect to FIG. 4.

It should be noted that although the example embodiments of the invention have been described in the context of a network device receiving and forwarding a "packet", it is within the scope of this invention for the devices to receive and forward one or more packets according to the methods and devices described herein.

While various example embodiments of the present invention have been described above, it should be understood that the embodiments have been presented by way of example, and not limitation. It will be apparent to persons skilled in the relevant art(s) that various changes in form and detail can be made therein without departing from the spirit and scope of the present invention. Thus, the present invention should not be limited by the above-described example embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A device deployed in a network for providing a virtual circuit service, the device comprising:
   a packet switch constructed to (i) correlate an identifier included in a received packet with first information representing at least one of a circuit identifier, a circuit bundle identifier, and a status identifier included in a circuit table, (ii) retrieve from a forwarding table, output interface information corresponding to the first information, and (iii) determine whether the output interface information corresponds to a circuit bundle with an active virtual circuit by identifying whether (a) the output interface information specifies an output circuit bundle identifier, and (b) the output circuit bundle identifier corresponds to second information, in a circuit bundle table, specifying the active virtual circuit,
   wherein the circuit bundle table includes information specifying a type of virtual circuits that included in each respective circuit bundle; and
   wherein the circuit bundle table includes data indicating whether a Media Access Control address withdraw message should be sent in a case where the active virtual circuit fails, and data indicating whether individual traps should be sent for the circuit bundle.

2. The device according to claim 1, further comprising: a processing module constructed to modify information included in at least one of the tables.

3. The device according to claim 2, wherein the processing module is also constructed to select a new active virtual circuit for the circuit bundle in response to a predetermined triggering event.

4. The device according to claim 3, wherein the triggering event includes at least one of the active virtual circuit failing, the processing module being provided with a configuration instruction, or recognizing that an inactive virtual circuit has a greater priority value than the active virtual circuit.

5. The device according to claim 4, wherein the processing module also is constructed to detect a virtual circuit failing by at least one of: detecting a loss of signal, receiving a failure notification message via the failed virtual circuit, detecting a failure of a Label Switched Path used by the virtual circuit, detecting a failure of a Label Distribution Protocol session used by the virtual circuit, and receiving a Label Withdraw message for withdrawing a Multi Protocol Label Switching label used by the virtual circuit.

6. The device according to claim 4, wherein the processing module is also constructed to select the inactive virtual circuit having a greater priority value than the active virtual circuit to be the new active virtual circuit after a predetermined time has elapsed from when there is recognition that the inactive virtual circuit has the greater priority value.

7. The device according to claim 2, wherein the processing module includes a processor.

8. The device according to claim 1, wherein the virtual circuit service includes at least one of a Virtual Private Wire Service and a Virtual Private LAN Service.

9. The device according to claim 1, wherein the packet is at least one of: a Virtual Private LAN Service packet, an Ethernet packet, an Interworking Function packet, a Virtual Local Area Network packet, a stacked Virtual Local Area Network packet, an Asynchronous Transfer Mode packet, and a Frame Relay packet.

10. The device according to claim 1, wherein the network includes at least one MultiProtocol Label Switching network.

11. The device according to claim 1, wherein a plurality of virtual circuits in each circuit bundle are a same virtual circuit type, and the virtual circuit type is at least one of Virtual Private LAN Service, Ethernet, Interworking Function, Virtual Local Area Network, stacked Virtual Local Area Network, Asynchronous Transfer Mode, and Frame Relay.

12. The device according to claim 1, further comprising: at least one of a router, an ultimate provider edge router, a switching provider edge router, and a bridge.

13. The device according to claim 1, wherein the circuit bundle includes a plurality of virtual circuits communicatively coupled with different network devices.

14. The device according to claim 13, wherein each of the plurality of virtual circuits employs Forwarding Equivalence Class 128.

15. A method of operating a device deployed in a network for providing a virtual circuit service, the method comprising:
correlating an identifier included in a received packet with first information representing at least one of a circuit identifier, a circuit bundle identifier, and a status identifier included in a circuit table;
retrieving from a forwarding table, output interface information corresponding to the first information; and
determining whether the output interface information corresponds to a circuit bundle with an active virtual circuit by identifying whether (a) the output interface information specifies an output circuit bundle identifier, and (b) the output circuit bundle identifier corresponds to second information, in a circuit bundle table, specifying the active virtual circuit,
wherein the circuit bundle table includes information specifying a type of virtual circuits that included in each respective circuit bundle; and
wherein the circuit bundle table includes data indicating whether a Media Access Control address withdraw message should be sent in a case where the active virtual circuit fails; data indicating whether individual traps should be sent for the circuit bundle.

16. The method according to claim 15, further comprising: adding a new virtual circuit to the circuit bundle.

17. The method according to claim 15, wherein at least one of the tables includes: data indicating a time before selecting an inactive virtual circuit having a greater priority value than the active virtual circuit to be a new active virtual circuit; and data indicating when the active virtual circuit can begin communicating.

18. The method according to claim 15, further comprising: removing a virtual circuit from the circuit bundle.

19. A network for providing a virtual circuit service between at least a first device and a second device, the network comprising:
at least one second provider edge device in communication with the second device, and
at least one first provider edge device in communication with the first device, the first provider edge device comprising:
a packet switch constructed to (i) correlate an identifier included in a received packet with first information representing at least one of a circuit identifier, a circuit bundle identifier, and a status identifier included in a circuit table, (ii) retrieve from a forwarding table, output interface information corresponding to the first information, (iii) determine whether the output interface information corresponds to a circuit bundle with an active virtual circuit by identifying whether (a) the output interface information specifies an output circuit bundle identifier, and (b) the output circuit bundle identifier corresponds to second information, in a circuit bundle table, specifying the active virtual circuit, and (iv) forward the received packet to the at least one second provider edge by way of the active virtual circuit,
wherein the circuit bundle table includes information specifying a type of virtual circuits that included in each respective circuit bundle; and
wherein the circuit bundle table includes data indicating whether a Media Access Control address withdraw message should be sent in a case where the active virtual circuit fails, and data indicating whether individual traps should be sent for the circuit bundle.

20. The network according to claim 19, wherein the first provider edge device selects one of a plurality of inactive virtual circuits to be a new active virtual circuit in response to at least one of a failure of the active virtual circuit, reception of a configuration instruction, or recognition that the inactive virtual circuit has a greater priority value than the active virtual circuit.

21. The network according to claim 19, wherein the at least one first provider edge device further comprises: a processing module constructed to modify information included in at least one of the tables.

22. A method of configuring a network device for providing a virtual circuit service between at least a first device and a second device, in communication with at least one second provider edge device, the method comprising:
receiving configuration instructions for configuring at least one first provider edge device;
generating in a circuit table, first information representing at least one of a circuit identifier, a circuit bundle identifier, and a status identifier, for the at least one first provider edge device, in communication with the first device, based on the configuration instructions; and
generating, in a circuit bundle table, second information representing a circuit bundle with an active virtual circuit and corresponding to an output circuit bundle identifier specified by output interface information,
wherein the circuit bundle table includes information specifying a type of virtual circuits that included in each respective circuit bundle; and
wherein the circuit bundle table includes data indicating whether a Media Access Control address withdraw message should be sent in a case where the active virtual circuit fails, and data indicating whether individual traps should be sent for the circuit bundle.

23. The method according to claim 22, wherein the first provider edge device selects one of a plurality of inactive virtual circuits to be a new active virtual circuit in response to received information indicating at least one of a failure of the active virtual circuit, reception of a configuration instruction, or recognition that the inactive virtual circuit has a greater priority value than the active virtual circuit.

* * * * *